United States Patent
Cheyer et al.

(10) Patent No.: US 12,242,559 B2
(45) Date of Patent: Mar. 4, 2025

(54) GAMEPLANS FOR IMPROVED DECISION-MAKING

(71) Applicant: Airbnb, Inc., San Francisco, CA (US)

(72) Inventors: Adam Cheyer, Oakland, CA (US); Siamak Hodjat, Los Gatos, CA (US)

(73) Assignee: Airbnb, Inc., San Francisco, CA (US)

( * ) Notice: Subject to any disclaimer, the term of this patent is extended or adjusted under 35 U.S.C. 154(b) by 0 days.

(21) Appl. No.: 17/993,766

(22) Filed: Nov. 23, 2022

(65) Prior Publication Data

US 2023/0161834 A1 May 25, 2023

Related U.S. Application Data

(60) Provisional application No. 63/282,852, filed on Nov. 24, 2021.

(51) Int. Cl.
*G06F 16/9538* (2019.01)
*G06F 16/954* (2019.01)
(Continued)

(52) U.S. Cl.
CPC ...... *G06F 16/9577* (2019.01); *G06F 16/9538* (2019.01); *G06F 16/954* (2019.01); *G06Q 10/0633* (2013.01)

(58) Field of Classification Search
CPC .......... G06F 16/9577; G06F 16/9538; G06F 16/954; G06F 16/2423; G06F 16/3329;
(Continued)

(56) References Cited

U.S. PATENT DOCUMENTS 7,552,104 B2 6/2009 Hansen et al.
8,346,681 B2 1/2013 Lauritsen
(Continued)

OTHER PUBLICATIONS

International Search Report and Written Opinion from International Patent Application No. PCT/US22/50966, dated Mar. 10, 2023.
(Continued)

*Primary Examiner* — Sanchita Roy
(74) *Attorney, Agent, or Firm* — McDermott Will & Emery LLP

(57) ABSTRACT

System receives request from user for decision making options, and provide gameplan document that suggests accessing first and second data source to collect options. System extracts first data records set from content copied by user from first data source, and inserts first data records set in first table in gameplan document. System extracts second data records set from content copied by user from second data source, and inserts second data records set in second table in gameplan document. System inserts combined data records set, based on first data records set joined with second data records set, in combined data table in gameplan document. System enables user to identify candidates, for options, in combined data records set in response to user commands. System determines overall scores corresponding to candidates, based on applying criteria, scored by user, to each candidate. System outputs candidates, ranked based on corresponding scores, as decision making options.

20 Claims, 17 Drawing Sheets

(51) Int. Cl.
*G06F 16/957* (2019.01)
*G06Q 10/0633* (2023.01)

(58) Field of Classification Search
CPC ..... G06F 16/41; G06F 17/40; G06Q 10/0633; G06Q 30/02; G06N 5/04; G06N 5/02
See application file for complete search history.

(56) References Cited

U.S. PATENT DOCUMENTS

| | | |
|---|---|---|
| 8,930,247 B1 | 1/2015 | Zhang et al. |
| 2010/0057645 A1* | 3/2010 | Lauritsen ............... G06N 5/042 706/11 |
| 2014/0164952 A1 | 6/2014 | Allen et al. |
| 2014/0172885 A1* | 6/2014 | Sekharan ............... G06F 16/958 707/755 |
| 2018/0165851 A1* | 6/2018 | Apte ..................... G06F 40/177 |
| 2020/0251111 A1 | 8/2020 | Temkin et al. |
| 2021/0397522 A1 | 12/2021 | Owen et al. |

OTHER PUBLICATIONS

International Search Report and Written Opinion from corresponding International Patent Application No. PCT/US2022/050963, dated Feb. 22, 2023.

* cited by examiner

200

Vacation House & AirBnb property zilliow-san-diego-4m    202

≡(0)≡  [_____] ▼ GO  ⋮

| Photo | Property Name | City | Offered | More Info | Type |
|---|---|---|---|---|---|
|  | ☐ 7756 Saint Andrews Rd | Rancho Santa Fe, CA | $6,350,000 | Link |  |
|  | ☐ 5859 Via Canada Del Osito | Rancho Santa Fe, CA | $4,998,000 | Link |  |
|  | ☐ 4540 Los Pinos | Rancho Santa Fe, CA | $7.8M | Link |  |

Rows:240 mashvisor-san-diego-4m    204

≡(0)≡  [_____] ▼ GO  ⋮

| AddressName | Propert... | Beds | Baths | Sq Ft | Neighborhood |
|---|---|---|---|---|---|
| ☐ 12 Spinnaker Way | $4,650,000 | 4 | 5 | 4,363 | Coronado |
| ☐ 3591 Ocean Front Walk | $4M | 3 | 2 | 1,201 | Mission Beach |
| ☐ 2626 Hidden Valley Rd | $4,150,000 | 4 | 5 | 6,022 | La Jolla |
| ☐ 2595 Ocean Front Walk #7 | $4.5M | 4 | 3 | 2,075 | Mission Beach |
| ☐ 2604 5th Ave #901 | $4,459,000 | 2 | 3 | 3,995 | Park West |

Rows:7

| | Huangcheng Noodle House | Chinese, Noodles | 8:00 | $$ |
|---|---|---|---|---|
| | Champa Garden | Thai, Laotian | 7:30,8 | $$ |
| | Marica | Seafood, American (New) | 8:00,8 | $$$ |

| RESTAURANTS × | | Copy |
|---|---|---|
| | | Paste |
| | | Insert Row |
| | | Delete Row |
| | | Map Locations |

ADD REVIEWS FROM YELP

FIG. 7

Restaurants

| | Restaurant Name | Cuisine | Times | Price Range | Stars | Num Reviews |
|---|---|---|---|---|---|---|
| ☐ | World Famous Hotboys | Southern | 7:45, 8:00, 8:30 | $$ | 4.5 | 123 |
| ☐ | Pomella | Middle Eastern | 7:30,8:30 | $$ | 5 | 11 |
| ☐ | Huangcheng Noodle House | Chinese, Noodles | 8:00 | $$ | 4.5 | 34 |
| ☐ | Champa Garden | Thai, Laotian | 7:30, 8:00, 8:15 | $$ | 4 | 22 |
| ☐ | Marica | Seafood American (New) | 8:00, 8:15 | $$$ | 4.5 | 33 |

Rows per page: 10 ▾    1-10 of 100

GAMEPLANS FOR IMPROVED DECISION-MAKING

CLAIM OF PRIORITY

This application claims the benefit of U.S. Provisional Patent Application 63/282,582 entitled, GAMEPLANS FOR IMPROVED DECISION MAKING by Cheyer, et al., filed Nov. 24, 2021, the entire contents of which is incorporated herein by reference.

BACKGROUND

Decisions are so important that a person may be perceived as the sum of all the decisions that the person has made in life. A person has decided where to live, what career to pursue, which partner to spend life with, how much to exercise, what shirt to wear today, and so on. The sum of the incremental decisions that a person subsequently makes can project whom that person becomes in the future. And yet, despite the cumulative importance of such decisions, most people use very ad-hoc and chaotic approaches to decision making, resulting in non-optimal results. Consequently, many people believe that if they can use computer software to noticeably improve the outcomes for many decisions that they make in their life and/or business, they will undoubtedly lead a more satisfying life and be more successful in their business goals.

When many people were interviewed about how they make decisions big and small, patterns emerged in their responses. Most people open up a web browser, go to their favorite search engine, type in keywords or questions, and then view the search results in multiple browser tabs as they researched various points related to their decision. Most people kept the accumulated information in their head, although some recorded simple notes on paper or on the notepad application of their smartphone.

As the process continued, they would interact with other people as needed, asking for opinions on research results at various levels of detail. Each person seems to have a rough amount of time allocated for when the decision should be made. After they felt they had considered enough alternatives, were comfortable that the number of perspectives from other people was sufficient, and when the allotted time had expired, most people would select the best option they had identified at that point in the decision-making process.

BRIEF DESCRIPTION OF THE DRAWINGS

FIG. 2 illustrates an example gameplan document with extracted data records for gameplans for improved decision making, under an embodiment;

FIG. 3 illustrates an example of adjusting scores for a candidate using hierarchical weighted decision criteria, for gameplans for improved decision making, under an embodiment;

FIG. 4 illustrates example drag handles to rearrange options in order of emotional preference for gameplans for improved decision making, under an embodiment;

FIG. 5 illustrates an example emotional boost on a calculated score for gameplans for improved decision making, under an embodiment;

FIG. 7 illustrates an example modal autocomplete widget for gameplans for improved decision making, under an embodiment;

FIG. 8 illustrates an example filter pane and quick search widget for gameplans for improved decision making, under an embodiment;

DETAILED DESCRIPTION

Figure 1:
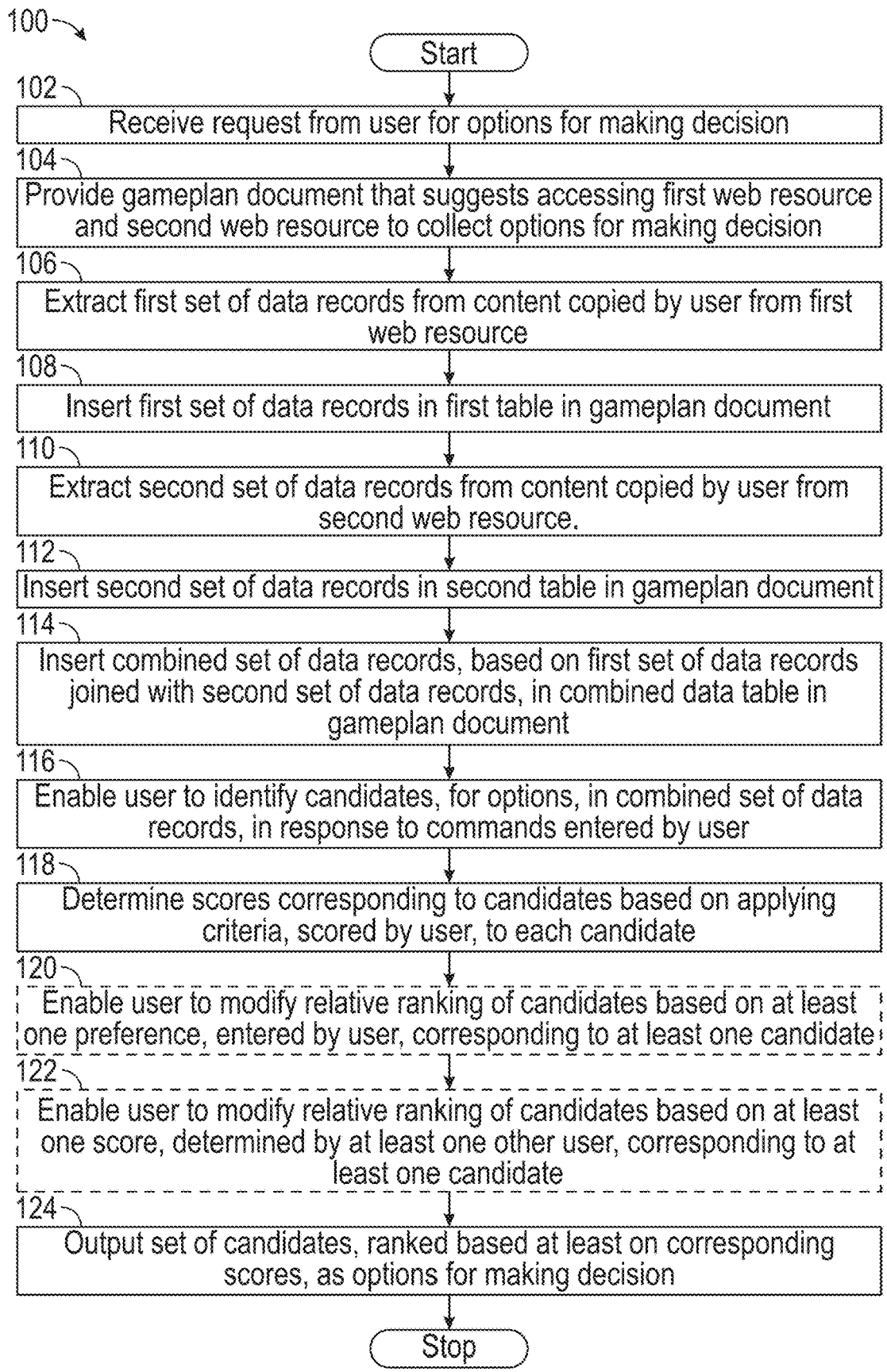
FIG. 1 is a flowchart that illustrates an example method for gameplans for improved decision making, under an embodiment.

A number of challenges are highlighted by the decision-making process described above, primarily summarized as relating to the integration and balance within and across the rational, emotional, and social aspects of decision making. Illustrating the rational aspect as one type of deliberation mechanism, many people rely on information, such as data, prescriptions, laws, and constraints, which are spread around and locked up within many different sources or websites, and are therefore difficult to integrate to get a complete picture of a situation. For example, when choosing which solar panel system to purchase or lease, a person can research the characteristics of different solar panels, such as size, output potential, and degradation over time, and related essential technologies, such as batteries, inverters, or microinverters, and tracking systems.

Then the person can attempt to comprehensively understand which solar panel systems have selected characteristics related to which technologies, which companies sell these systems, the ratings and reviews of these companies, the financial stability for each company to ensure that the company will be in business to take care of any problems 15 or 20 years in the future, the federal and state tax incentives for solar power systems, and so on. Since there is not any website or data source that possesses all the data to consider in an easy-to-integrate location, many people open many browser tabs, try to identify many specific products or companies on each site, and then attempt to integrate all the information about all these products and companies from across each website. As this is a complex task that exceeds the capacity of most people to perform optimally, when the decision time clock has expired, they are likely to make a less-than-optimal decision.

Illustrating the emotional aspect of decision-making as one type of deliberation mechanism, as a person considers different alternatives, many emotions arise about a decision, some emotions conflicting and some emotions complementing each other. For example, when considering if they should leave their present job to take a more prestigious position at a new company, many people may express emotions such as "I'm excited about the new role, but a bit worried that I might not be up to the task. I really desire the additional income, but the boss I would be reporting to seems rather strict and I'm scared I will not get along with her. I'm comfortable in my current role and company but feel stagnated and that I'm not growing in my skills." With all of these potentially conflicting emotions, many people face a challenge choosing what to do.

Illustrating the social aspect of decision-making as one type of deliberation mechanism, a person often benefits from interacting with other people to learn from the perspectives of friends, family, experts, or other stakeholders potentially impacted by a decision. Some challenges involve finding people, who may be referred to as recommenders, who a person can trust to interact with on a given decision topic, getting more than just the top-level suggestion from a recommender. Since a person may not be able to comprehend the full rationale behind each recommendation; and then merge and integrate recommendations from multiple recommenders, the person may not fully understand how they agree, how they disagree, or why they disagree with their recommenders. When choosing which college to attend, a person's significant other may have one set of preferred school options, their mother may have another set of options, and their high school guidance counselor may have differing opinions about each of these options. Many people want to be able to integrate such potentially helpful information in a way that makes sense and moves their decision-making process forward.

Not only is there a challenge of integrating and balancing competing, conflicting, and complementary information within each of the rational, emotional, and social aspects of decision making, it is a challenge for a person to integrate and balance considerations across these three aspects of decision-making. For instance, when choosing whether and where to move to a new location across the country, the reasoned data may be pointing a person in one direction, the important people in the person's life may be saying something else, and the person's heart and emotions may be leading towards an altogether different option. Most people want to be able to balance such aspects in their decision-making process to come to a conclusion that is satisfying and be confident that they are making the right decision. Additionally, as people make similar decisions in the future, many want to learn about how they have made decisions and then optimize this process going forward so that they make continually better decisions over the course of their lives.

Yet additional challenges exist because content providers, such as Yelp, MovieTickets, LinkedIn, and Zillow, are seldom enthusiastic about providing content sources, such as live web services, web crawlers, data files, and data feeds, which provide their proprietary content to be used by other parties. While this use is sometimes grudgingly accepted for business reasons, such as a licensing fee or because a third-party brings a large user base as potential traffic to their website, content providers do not usually like allowing a third-party to present the content provider's content in a way that the content provider cannot control the user experience or represent their brand appropriately. Content providers do not want to be disintermediated by being cut out of the end-user experience. For example, if a person enters "movies in palo alto" into a web search engine, the person might select a link from the search engine's results that takes the person to a content provider's website which includes content about movies' scheduled showtimes in the city of Palo Alto.

However, often a search engine's first page of excerpted results directly displays the answers to a person's query, such that the person never selects any search results' displayed links to any originating content provider's content and advertising. A content provider may perceive that when a person gets their query answers without selecting a link to the content provider's content as if the search engine is being credited for the content provider's content. Additionally, the advertising revenue models of the originating content provider's website are compromised when the number of users who browse the content provider's website and view their advertisements becomes minimized. Content providers also dislike enabling redistribution of their content to web-crawling robots, rather than humans, which access their websites, as this defeats the purpose of advertising, the main source of a content provider's revenue.

Addressing these and other challenges, a GamePlanner system provides a gameplan, which can be defined as an interactive document that contains textual and structured data elements and tools that help a system user comprehensively understand options and make improved decisions. The goal of a GamePlanner system is to not only assist system users to arrive at the right decisions for them, but to help them understand how they came to these decisions, what tradeoffs were made, what data and logic supported their outcomes, and how the emotional and social aspects of decision-making influenced the rational aspects of their decision-making process. By capturing not only the original options and the selected choice, but the fully transparent explanation of every aspect of how a decision was made, a GamePlanner system enables a system user to revisit previous decisions by reviewing a completed gameplan document, and learn how to improve the decision-making process over time. System users can not only learn from their past experiences, but gameplans from other decision experts and content creators may be shared, published, and discovered by system users, allowing an entire community of system users to raise their collective ability to make the best decisions for themselves.

Embodiments of this disclosure provide gameplans for improved decision-making. A system receives a request from a user for options for making a decision and provides a gameplan document that suggests accessing a first data source and a second data source to collect the options. The system extracts a first set of data records from first content copied by the user from the first data source and inserts the first set of data records in a first table in the gameplan document. The system extracts a second set of data records from second content copied by the user from the second data source and inserts the second set of data records in a second table in the gameplan document.

The system inserts a combined set of data records, based on the first set of data records joined with the second set of data records, in a combined data table in the gameplan document. The system enables the user to identify candidates, for the options, in the combined set of data records, in response to commands entered by the user. The system determines overall scores corresponding to the candidates, based on applying criteria, scored by the user, to each candidate. The system outputs a set of candidates, ranked based at least on the corresponding scores, as the options for making the decision.

For example, a system user requests help in finding a California house to buy, stay in during vacations, and otherwise rent as an AirBnb property, and then a GamePlanner system provides a gameplan document that suggests accessing a real estate website that lists California houses for sale and an investment website that calculates return on investment data for potential AirBnb properties. The user applies a smart copy and paste command to some of the real estate website's content, so the system extracts the data for some California houses for sale and inserts this real estate data into a gameplan document table. Similarly, the user applies a smart copy and paste command to some of the investment website's content, so the system extracts the data for some potential AirBnb houses in California and inserts this investment data into another gameplan document table.

In response to the user entering a command to join the tables storing the real estate data and the investment data, the system combines the real estate data and the investment data into a combined data table. When the user enters a command to use the return-on-investment data to sort the data in the combined data table, the system outputs sorted data for houses which are for sale, identified as good return-on-investments, and therefore candidates for the user to purchase. Responding to the user entering scores for weighted criteria for the candidate houses, the system determines an overall score for each of the candidate houses, outputs a map of the houses with the highest overall scores and suggests the highest-scoring house as the best option for the user.

FIG. 1 is a flowchart that illustrates a method for gameplans for improved decisions, under an embodiment. Flowchart 100 illustrates method acts illustrated as flowchart blocks for certain steps involved in and/or between the clients 1802-1808, the GamePlanner Application 1824, and/or the server 1810, which may be referred to as the GamePlanner system 1810 of FIG. 18.

A request is received from a user for options for making a decision, block 102. The system receives users' requests for options that improve their decision-making processes. For example, and without limitation, this may include the GamePlanner system 1810 receiving a request from a smartphone 1806, which is registered to a system user named Alice, for help in finding a house to buy as a vacation house in southern California that can also be rented out as an AirBnb property when Alice is not using it during her vacation.

A request can be an instruction to a computer to provide information or perform another function. A user can be a person who operates a computer. An option can be an alternative, possibility, or course of action. A decision can be a conclusion or resolution reached after consideration.

In response to receiving a request for options for making a decision, a gameplan document is provided that suggests accessing a first data source and a second data source to collect the options, block 104. The system identifies and then provides gameplan documents that can help identify options that improve users' decision-making process. By way of example and without limitation, this may include the GamePlanner system 1810 responding to Alice's request by providing a gameplan document that suggests accessing Zillow.com, a website that lists houses for sale, and Mashvisor.com, which is a website that performs advanced analytics to calculate the return on investment for potential AirBnb properties, to collect the options for her property-purchasing decision. Although this example describes a gameplan that improves decision-making by ranking options, other types of gameplans improve binary decisions, which are based on whether or not a system user should take a specific course of action, and improve value decisions, which are based on the amount of resources that a system user should spend on an endeavor. A gameplan document can be an electronic data structure that stores information for a strategy. A data source can be an asset that is accessible over the Internet.

The GamePlanner system 1810 uses a natural language processor to understand users' requests, such as understanding that a request that mentions purchasing an electric car might be partially satisfied by a gameplan document's suggestion to access a Tesla website. As one part of the rational aspect of making decisions, when a natural language processor has understood a user request, the GamePlanner system 1810 searches a database of existing gameplan documents to identify which, if any, of the gameplan documents suggest accessing data sources to collect options which best satisfy the user request for options. If only one gameplan document satisfies a relevancy threshold for a user request, the GamePlanner system 1810 provides that gameplan document to the user. Even if the one gameplan document barely surpasses the relevancy threshold, the user may be able to modify this gameplan document to meet the user's needs more easily than the user creating a gameplan document entirely by themselves, especially if the GamePlanner system 1810 suggests adding an additional data source to this gameplan document that increases the relevancy of the gameplan document. Although examples describe gameplan documents that suggest accessing two data sources to collect options, gameplan documents may suggest accessing more than two data sources to collect options.

If no gameplan document satisfies a relevancy threshold for a user request, the GamePlanner system 1810 may provide suggestions to access specific data sources that were used by existing gameplan documents and that address the different parts of the user request, which may assist the user to create their own gameplan document. If multiple gameplan documents satisfy a relevancy threshold for a user request, the GamePlanner system 1810 can provide all the gameplan documents, or a shortened list of the most relevant gameplan documents, depending on the number of relevant gameplan documents, to the user. The GamePlanner system 1810 can select one of the sufficiently relevant gameplan documents which was created by a gameplan author who has subscribers who follow the author's gameplan documents, including the requesting user.

A data source may include any of a website, a data file, a data feed, a live web service, and/or a web crawler. A website can be a set of related digital pages located under a single domain name, typically produced by a single person or organization. A data file can be a digital structure which stores information. A data feed can be a mechanism for users to receive updated information from an information source. A live web service can be any piece of software that makes itself available over the Internet and uses a standardized XML messaging system. A web crawler can be a robot, bot, or spiderbot that systematically browses sites on the Internet.

Many content providers offer live web services or APIs (Application Programmer Interfaces) that enable a Game- Planner system 1810 to access their content. These live web services and APIs are particularly useful for a GamePlanner system 1810 to access frequently changing data, as they enable rapid and programmatic updating of the latest content. Web search engine providers such as Google or Microsoft typically utilize robots that crawl the world wide web to build a search index of aggregated content to power their search result recommendations. Most of these search engines, in addition to building an unstructured index, perform structured extraction on the content their web-crawling robots identified to build an aggregated knowledge graph of structured content. These search engines often surface content in one-box style results, such that when the GamePlanner system 1810 can infer a system user's intent, the GamePlanner 1810 can use the knowledge graph to query for appropriate results from the structured cache.

As an example which involves the social aspect of making decisions, one way for a GamePlanner system 1810 to collect options is to enable a system user to ask other people, who may be stakeholders with the user, to contribute their ideas for options. The GamePlanner system 1810 can merge and then deduplicate these suggested options to generate a list of options in a gameplan document for a system user to consider. The GamePlanner system 1810 may collect options via manual entry, which is simply a system user enumerating options, which is applicable when there are a small set of potential options that are known in advance by the system user.

Continuing the ongoing example, after selecting the link in the gameplan document to Zillow.com, Alice accesses the Zillow.com website and begins entering search criteria, such as the California counties where the houses of interest are located, and the maximum price to pay for a house, and applies filters for other desired attributes, such as amenities, and the numbers of bedrooms and bathrooms in a house. The Zillow.com website responds to the search criteria and filters entered by Alice by listing properties that match these criteria and filters. After searching on the Zillow website, Alice selects content displayed by a Zillow webpage, applies the standard copy command to save the selected content to the operating system's clipboard, and then executes the paste command to paste the selected content in the gameplan document.

Further to this example, Alice did not know about Mashvisor until she used the gameplan document to select the link to the Mashvisor.com website, then she meets the requirements to access the website's data by registering as a user, and begins specifying search criteria and filters to explore southern California neighborhoods for houses of interest. The Mashvisor.com website responds to the search criteria and filters specified by Alice by analyzing price and occupancy data in her specified neighborhoods and the mortgage costs associated with purchasing the houses. After searching on the Mashvisor website, Alice selects content displayed by a Mashvisor webpage, applies the standard copy command to save the selected content to the operating system's clipboard, and then executes the paste command to paste the selected content in the gameplan document.

After the first data source is suggested, a first set of data records is extracted from content copied by the user from the first data source, block 106. The system extracts a user's data from data sources directly accessed by the user. In embodiments, this may include the GamePlanner system 1810 extracting the data for a list of San Diego County houses for sale that is currently displayed by a Zillow webpage, and that is in the content to which Alice applied the smart copy and paste commands. The smart copy and paste commands identify the labels and the content of all the tables in a data source, determine which tables store data that is relevant to the gameplan document, and generate extraction rules that target the relevant data in the data source's tables. If the labels are missing from any of the data source's tables, then the smart copy and paste commands will automatically guess the tables' missing labels, based on similar tables which were accessed in the past. Extracting may include removing relevant semantic records, instead of removing raw Hyper Text Markup Language (HTML) text, from content copied by a system user.

The smart copy and paste commands will also guess any of the columns' missing types, based on similar columns which were accessed in the past. Then the smart copy and paste commands present the possible labels and column types to the user, with the option to approve or disapprove of the possible labels and column types. If the user approves of the possible labels and column types, the approval saves these corrected definitions to the data source. When the gameplan document is published with the extraction rules and the label and column type corrections, the publisher can accept or reject the label and column type corrections. The publisher attempts to establish common terminology for the same type of labels and column types by encouraging users to adopt standardized labels for shared ideas about labels and column types. If a data source such as a website is revised, an auto-learning feature attempts to detect newer versions of the previously referenced tables and columns.

A set can be a collection of distinct entities. A data record can be a number of related items of information which are handled as a unit. Content can be information made available by a website or other electronic medium. A relevant semantic record can be a number of related items of information which are handled as a unit and have an applicable meaning. Hyper Text Markup Language can be a standard text-encoding system for documents designed to be displayed in a web-browser. Text can be data in the form of words or alphabetic characters.

When enabling the generation of gameplan documents, the GamePlanner system 1810 uses personal semantic extraction, which is a novel solution to the content provider's problems which are described above. This personal semantic extraction avoids many of these described issues, and instead offers content providers numerous benefits they appreciate. The GamePlanner system 1810 drives new traffic to the content providers' websites, where human users consume all of the branding and the revenue-producing services such as advertising, signups, premium charges, and so forth.

Without incurring any of the other disadvantages described above, personal semantic extraction adds value to the content available on the content providers' websites by enabling new use cases created through joining a content providers' data with another content providers' data. Personal semantic extraction enables a system user who is browsing a website and selects content displayed on a webpage to extract the structured elements that the webpage displays, and then paste these elements into a gameplan document where these elements may be joined, sorted, searched, and filtered, with other data from other content providers. When the system user accesses any website to enter the search criteria, apply filters, and to view the search results, the system user is consuming the advertising and branding displayed by the website.

The GamePlanner system 1810 uses personal semantic extraction to extract relevant semantic records, instead of extracting all of the raw HTML text, from the content copied from a webpage. If a webpage contains multiple pages of query results, a system user can navigate to the next webpage, and copy selected content from the next webpage, which triggers the GamePlanner system 1810 to extract additional relevant semantic records. A system user can also execute smart copy and paste commands by selecting content from a web page, dragging the content to the gameplan document, and dropping the selected content in the gameplan document. Instead of the smart copy and paste commands, a system user can use a browser extension which enables the ability to not only extract the relevant semantic records from the content selected to be copied from a webpage, but to automatically detect the next page link on the webpage, and to page through structured content for all webpages which display the query results from the current search query. Compared to the smart copy/paste method, the browser extension method requires more up-front work by a system user to install, but offers the added advantage of streamlining the process of navigating through multiple webpages to extract the relevant semantic records from all of the query results.

Following the extraction of the first set of data records, the first set of data records is inserted in a first table in the gameplan document, block 108. The system inserts a user's data extracted from data sources into a gameplan document table provided for the user. For example, and without limitation, this may include the GamePlanner system 1810 inserting the data for the list of the San Diego County houses for sale that is currently displayed by the Zillow webpage and that is in the content to which Alice applied the smart copy and paste commands, into a spreadsheet-type structured table in the gameplan document. The GamePlanner system 1810 uses personal semantic extraction to insert relevant semantic records, instead of the raw HTML text, from the content copied from a webpage, into a table in the gameplan document. Then the GamePlanner system 1810 discards all of the non-structured content copied from the Zillow webpage. A table can be a data structure stored by a computer system.

Having suggested the second data source, a second set of data records is extracted from second content copied by the user from the second data source, block 110. The system extracts a user's data from data sources directly accessed by the user. By way of example and without limitation, this may include the GamePlanner system 1810 extracting the data for the list of the potential AirBnb houses in San Diego County that is currently displayed by the Mashvisor webpage, and that is in the content to which Alice applied the smart copy and paste commands. The GamePlanner system 1810 used personal semantic extraction to extract relevant semantic records, instead of extracting all of the raw HTML text, from the content copied from a Mashvisor webpage.

Since the second set of data records is extracted, the second set of data records is inserted in a second table in the gameplan document, block 112. The system inserts a user's data extracted from data sources into a gameplan document table provided for the user. In embodiments, this may include the GamePlanner system 1810 inserting the data for the list of the potential AirBnb houses in San Diego County that is currently displayed by the Mashvisor webpage and that is in the content to which Alice applied the smart copy and paste commands, into a spreadsheet-type structured table in the gameplan document. The GamePlanner system 1810 uses personal semantic extraction to insert relevant semantic records, instead of the raw HTML text, from the content copied from a Mashvisor webpage, into a table in the gameplan document, and then discards all of the non-structured content copied from a Mashvisor webpage.

After once again performing personal semantic extraction, the system user now has two spreadsheet-like tables in their gameplan document, one table containing Zillow properties data for a specified area and another table containing Mashvisor analyses of properties in that same area. FIG. 2 depicts a gameplan document 200 with extracted data records, such as the user-selected data 202 from the website for Zillow.com and the user-selected data 204 from the website for Mashvisor.com.

After inserting the first set of data records and the second set of data records in the gameplan document, a combined set of data records, based on the first set of data records joined with the second set of data records, is inserted in a combined data table in the gameplan document, block 114. The system joins all of the extracted data records. For example and without limitation, this may include the GamePlanner system 1810 combining the data from the gameplan document table for Zillow.com and the data from the gameplan document table for Mashvisor.com into one gameplan document table that can now be sorted, searched, filtered, and visualized, with columns from both of the original gameplan document tables, in response to Alice selecting a join table command from the Zillow table with the argument that identifies the Mashvisor table,. If either the first table or the second table is designated as the combined data table, then upon the completion of the join table command, this combined data table stores additional data and therefore becomes a new table which may be referred to as the combined data table. A combined set can be a collection of distinct entities from different sources. A combined data table can be a joined information structure stored by a computer.

Each gameplan document's table is optionally associated with an innovative command acceleration bar that enables fast access to every command available in the context of the gameplan document's table. A system user can select from the command acceleration bar to browse all of the top-level commands, including join, sort, search, filter, and more. As the system user enters text, the command acceleration bar filters the initially displayed commands to depict only those commands which match the entered text. The description further below about the command acceleration bar provides more information about how it functions.

Following the insertion of the combined set of data records, the user is enabled to identify candidates, for the options, in the combined set of data records, in response to commands entered by the user, block 116. The system identifies candidates for options from the joined data. By way of example and without limitation, this may include the GamePlanner system 1810 outputting data for 8 Riverside County houses, from the houses listed by the Zillow and Mashvisor webpages, as the 8 best return-on-investments, and therefore the 8 best candidates for purchase as a vacation house/AirBnb property, in response to Alice entering a command to sort the houses listed by both webpages by the return-on-investment column from the Mashvisor webpage. Since the Zillow website has data for houses for sale but has no data for return-on-investments houses, and the Mashvisor website has data for return-on-investments houses but has no data for houses for sale, the GamePlanner system 1810 combined the data from both websites to be able to identify the 8 Riverside County houses listed for sale and listed as good returns-on investments.

The commands entered by the user may be a sort command, a filter command, and/or a search command. A candidate can be a thing regarded as suitable for or likely to receive a particular treatment or position. A command can be an instruction that causes a computer to perform one of its basic functions. A sort command can be an instruction that causes a computer to rearrange data in a specified sequence. A filter command can be an instruction that causes a computer to remove unwanted records. A search command can be an instruction that causes a computer to systematically retrieve information.

A system user may want to narrow down the long list of joined data from multiple websites to an identified few candidates for options that merit serious consideration. Using the sort, search, and filter commands available from a graphical user interface or a command accelerator bar, a system user can view the joined data in a gameplan document table in different ways and can apply filters to narrow down the joined data to identify the candidates. When a system user selects a column header in a gameplan document table, the GamePlanner system 1810 can iterate through three sort states, sort ascending, sort descending, and non-sorted. When the GamePlanner 1810 system sorts a table, the empty row at the bottom of a table's column stays fixed there so that a system user can continue adding new data there.

Having identified candidates, overall scores corresponding to the candidates are determined based on applying criteria, scored by the user, to each candidate, block 118. The system uses weighted criteria to score candidates for options. In embodiments, this may include the GamePlanner system 1810 determining an overall score for each of the 8 candidate houses in Riverside County by enabling Alice to enter elemental scores for the hierarchical weighted decision criteria. An overall score can be a number that expresses comprehensive excellence in accumulated points and/or by comparison to a standard. Criteria can be a principle or standard by which something may be judged.

A system user can consider the decision to be made and enumerate the criteria that are most important, accept a gameplan document's existing criteria, or apply a combination of the enumerated and existing criteria, and then score the candidates with respect to these criteria. Since some of the criteria may be more important than other criteria, a system user can use the GamePlanner system 1810 to assign relative weights to each criteria, which indicates how much each criteria contributes to the overall score for each of the candidates. Given a list of candidates, a system user can select to use hierarchical weighted decision criteria which is a powerful method that the GamePlanner system 1810 may use to compare the candidates. Consequently, some criteria may be top-level criteria that include lower-level criteria which contribute to the determination of the top-level criteria's score, with each lower-level criteria corresponding to its own lower-level weight.

Therefore, criteria scored by the system user, may include hierarchical weighted decision criteria that includes a first criteria corresponding to a first criteria weight, wherein the first criteria includes a first sub-criteria corresponding to a first sub-criteria weight and a second sub-criteria corresponding to a second sub-criteria weight, and a second criteria corresponding to a second criteria weight. Hierarchical weighted decision criteria can be standards by which something may be judged, which is adjusted by factors to take relative levels of importance into account, and which is arranged according to the relative levels of importance. A criteria weight can be a factor that is used to adjust a standard by which something may be judged by taking relative importance into account. A sub-criteria can be a standard by which something may be judged, and which is at or from a lower level or position. A sub-criteria weight can be a factor that is used to adjust a standard by which something may be judged, by taking relative importance into account, and which is at or from a lower level or position.

For example, when Alice thinks about what is personally important for purchasing a house for her vacations and that may also be rented as an AirBnb property, she creates a list of goals that are listed below, such as an interior with premium amenities, a spacious exterior, good for entertaining friends, and a preferred location. Some of Alice's criteria are more important than others, and some have sub-criteria; such as the location score is calculated based on a combination of the location's convenience, the location's safety, and the quality of the school district.

Overall Score
    Interior (60%)
        Natural light (5%)
        High ceilings (15%)
        Master bed, bath, and closet (60%)
        Main living space (20%)
    Spacious Exterior (10%)
    Good for entertaining friends (5%)
    Preferred Location (15%)
        Convenience (60%)
        Safety (15%)
        Quality of school district (25%)
    Price & Value (10%)

The process of scoring candidates involves a system user researching each criteria, and any sub-criteria in a hierarchical weighted decision criteria, and then assigning a score for each criteria and any sub-criteria, each of which may be referred to as a decision criteria score. Decision criteria scores are assigned consistent values so that they may be combined, such as assigning scores that are a number between 1, the lowest possible score, and 10, the highest possible score, or a real number from 0.0 to 1.0 with 0.5 being default neutral, or scaled to any consistent scoring mechanism, such as the Likert scale from 1 to 5. Similarly, each criteria and any sub criteria are assigned consistent weights, such as on a 0.0 to 1.0 scale, and the aggregation of the assigned weights may total to a specific value that provides a standard for comparison, such as 1.0. Decision criteria scores are different from and used to rank data values, such as an offer to purchase a house has a data value of $6.35 million, and a system user assigns a decision criteria score of 0.1 to this data value because this data value establishes the house as one of the more expensive houses that is a candidate for the system user.

The GamePlanner system 1810 may automatically calculate a decision criteria score by using a distribution from a minimum value to a maximum value in a distribution set, such as assigning a score of 0.0 to the candidate house that has the highest offer price of $11 million and assigning a score of 1.0 to the candidate house that has the lowest offer price of $1 million. However, a minimum value for a price may not always represent the best option for a user, such as when a user is shopping for cars, the user does not want to purchase a car that costs only $100. Therefore, the GamePlanner system 1810 may automatically calculate a decision criteria score based on proximity to a user-specified target value which is between a minimum value and a maximum value in a distribution set, For example, the automatically calculated decision criteria score increases as the cost for a car increases from the minimum cost of $100 for a car to the target value of $30,000 for a car, and the automatically calculated decision criteria score also increases as the cost for a car decreases from the maximum cost of $200,000 for a car to the target cost of $30,000 for a car. The GamePlanner system 1810 may use a relative ranker, which applies an even distribution of N items from 0.0 to 1.0 to a data value, such as assigning an evenly distributed number to the ranked distances from each house to the beach, so that a relatively higher score initially assigned to the second house which is scored, and which is closest to the beach of first two candidate houses to be scored, is replaced by a relatively lower score as additional candidate houses are identified which are closer to the beach. In addition to calculating decision criteria scores, the GamePlanner system 1810 may also use a learned function that provides an estimated weighting for a system user's manually entered decision criteria score or even for an automatically calculated decision criteria score.

The GamePlanner system 1810 may provide an explanation note to assist a system user to manually assign each decision criteria score. The GamePlanner system 1810 may also assist a system user by suggesting the addition of a criteria for a gameplan document. For example, the GamePlanner system 1810 identified that the majority of the other gameplan documents that involved purchasing a house also included the criteria "good for entertaining," identified that Alice's gameplan document involved purchasing a house but did not include this criteria, and suggested that Alice add the criteria "good for entertaining" to her gameplan document.

When suggesting the addition of a criteria for a gameplan document, the GamePlanner system 1810 may also suggest automatically calculating a decision criteria score for the suggested criteria. For example, the GamePlanner system 1810 suggests submitting an internet query for both the name of the city where a candidate house is located and the word "entertaining," and counting the number of records in the query result as a proxy for a candidate house being good for entertaining. Therefore, the automatically calculated decision criteria score ranges from the minimum value to the maximum value for query results, such as assigning a score of 0.0 to the candidate house that is in a city that has the fewest number of query results for "entertaining" and assigning a score of 1.0 to the candidate house that is in a city that has the greatest number of query results for "entertaining."

Different design elements may be used to enable a system user to set values for a decision criteria score, such as an entered number value, a slider (no number), or a Likert scale with different emoji representations (0.10, 0.30, 0.50, 0.70, 0.90), or icons that express degrees of like or dislikes. To expedite and facilitate the manual assigning of scores, if a user selects a super-like icon, which may be referred to as a love icon, as a decision criteria score, the corresponding candidate is assigned a special maximum value, such as greater than 1.0 on a scale of 0.0 to 1.0, which results in the candidate ranking at the top of the list of candidates. Similarly, if a user selects a super-dislike icon, which may be referred to as a hate icon, as a design criteria score, the corresponding candidate is assigned a special minimum value, such as less than 0.0 on a scale of 0.0 to 1.0, which results in the candidate ranking at the bottom of the list of candidates.

As the system user examines each candidate and assigns scores for each criteria and any sub-criteria, the overall score is calculated by summing the weighted scores of each-criteria, with some criteria scores based on scoring each of the criteria's corresponding sub-criteria, applying the sub-weights corresponding to each sub-criteria, summing each weighted sub-criteria score, applying the weights corresponding to each criteria, and then summing each weighted criteria score. The equation for determining the example overall score from the-criteria and sub-criteria and their corresponding weights, which are listed above is:

$$\begin{aligned}Score = {} & Weight_1 * CriteriaScore_1 \\ & (sub\text{-}weight_A * sub\text{-}criteria_A + sub\text{-}weight_B * sub\text{-}criteria_B + \\ & sub\text{-}weight_C * sub\text{-}criteria_C + sub\text{-}weight_D * sub\text{-}criteria_D) + \\ & Weight_2 * CriteriaScore_2 + Weight_3 * CriteriaScore_3 + \\ & Weight_4 * CriteriaScore_4 (sub\text{-}weight_E * sub\text{-}criteria_E + sub\text{-}weight_F * sub \\ & -criteria_F + sub\text{-}weight_G * sub\text{-}criteria_G) + Weight_5 * CriteriaScore_5\end{aligned}$$

Weights are shared across all candidates, whereas the system user can assign un-weighted, or elemental, scores at each level of the hierarchy for each candidate. Since a system user can score as many or as few criteria and sub-criteria as the system user wants, if a system user does not assign a score which is required for a criteria or a sub-criteria, then the GamePlanner system 1810 may assign a default mid-point score, such as 5 on the scale of 1 to 10, or automatically assign a score using a relative ranker or a distribution from a minimum value to a maximum value in a distribution set, as described above.

Figure 3:
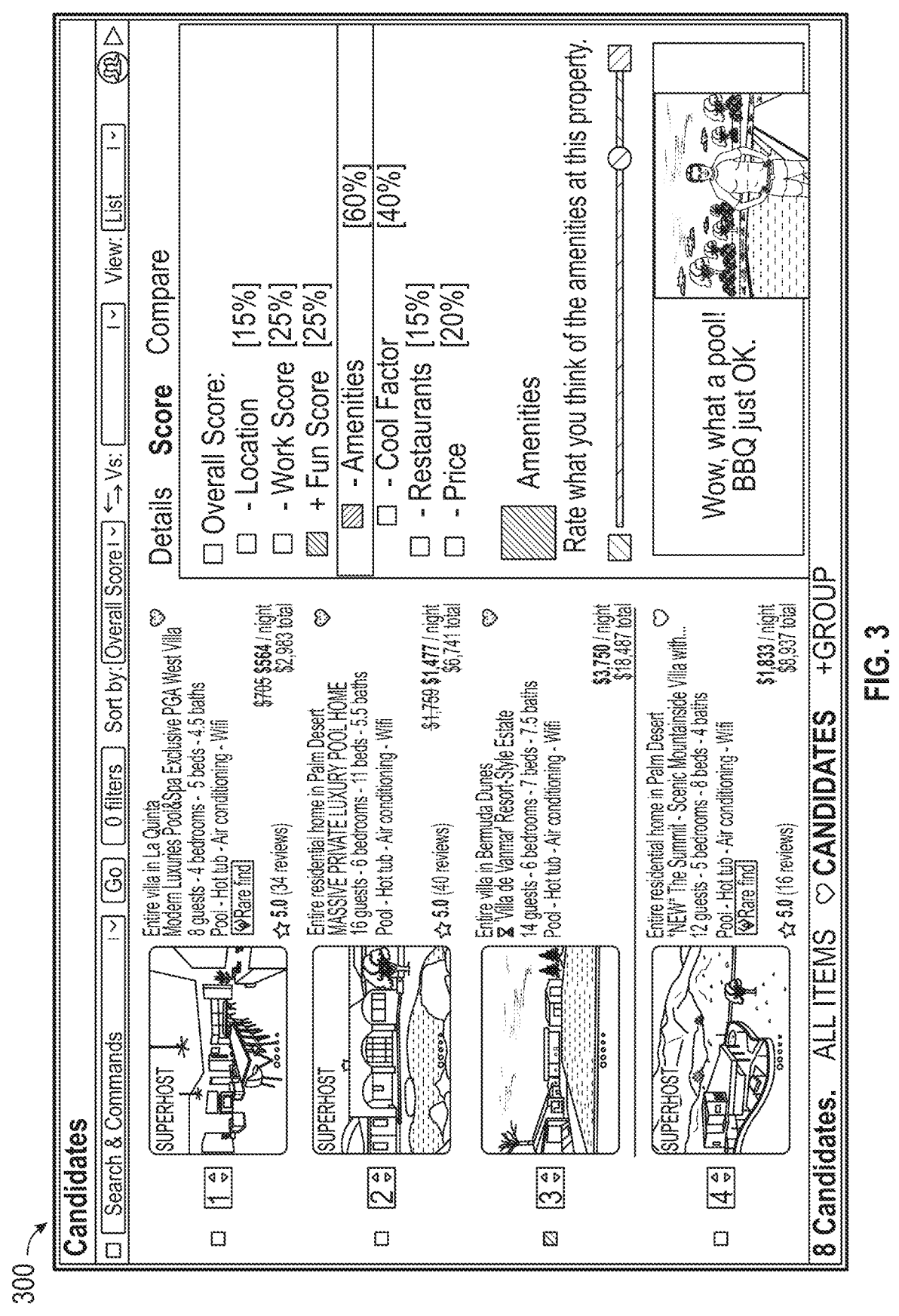

As the system user assigns scores at various levels of the criteria hierarchy, design affordances can show how these scores are trickling up to adjust the overall score. If the GamePlanner system 1810 sorts the candidates by the overall score, as the system user assigns each elemental score, the GamePlanner system 1810 moves each candidate to their sorted ranking based on the calculated overall scores. Additionally, as the system user adjusts the weights, such as reducing the 60% weight for the interior criteria, the GamePlanner system 1810 re-sorts the candidates into the resulting order. This interactive and immediate feedback facilitates the system user's deliberation about the individual candidates relative to each other, and adjusting the weights allows reflection about the relative importance of each criteria and sub-criteria. FIG. 3 illustrates an example of adjusting scores for a candidate using hierarchical weighted decision criteria.

Figure 4:
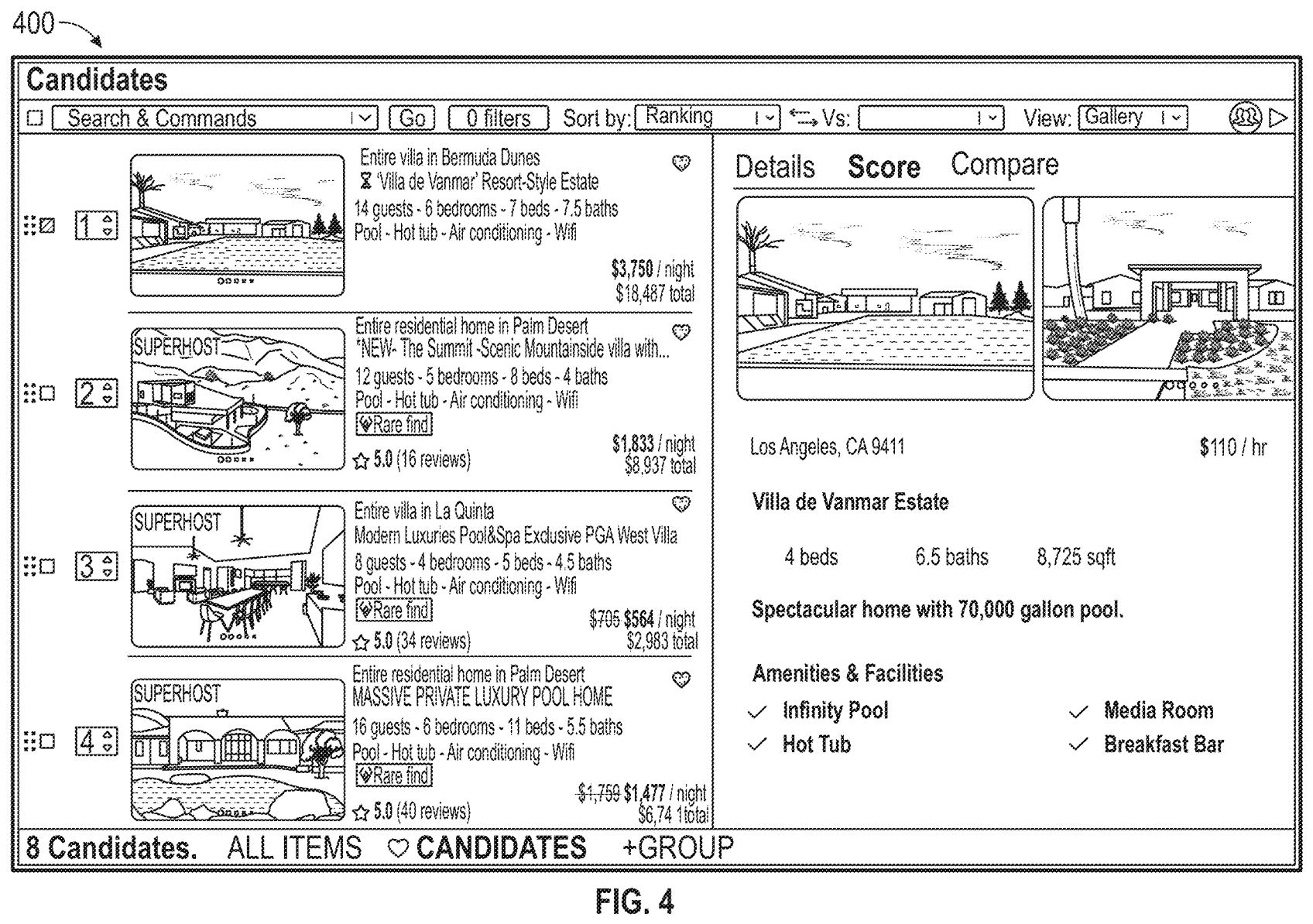
Figure 5:
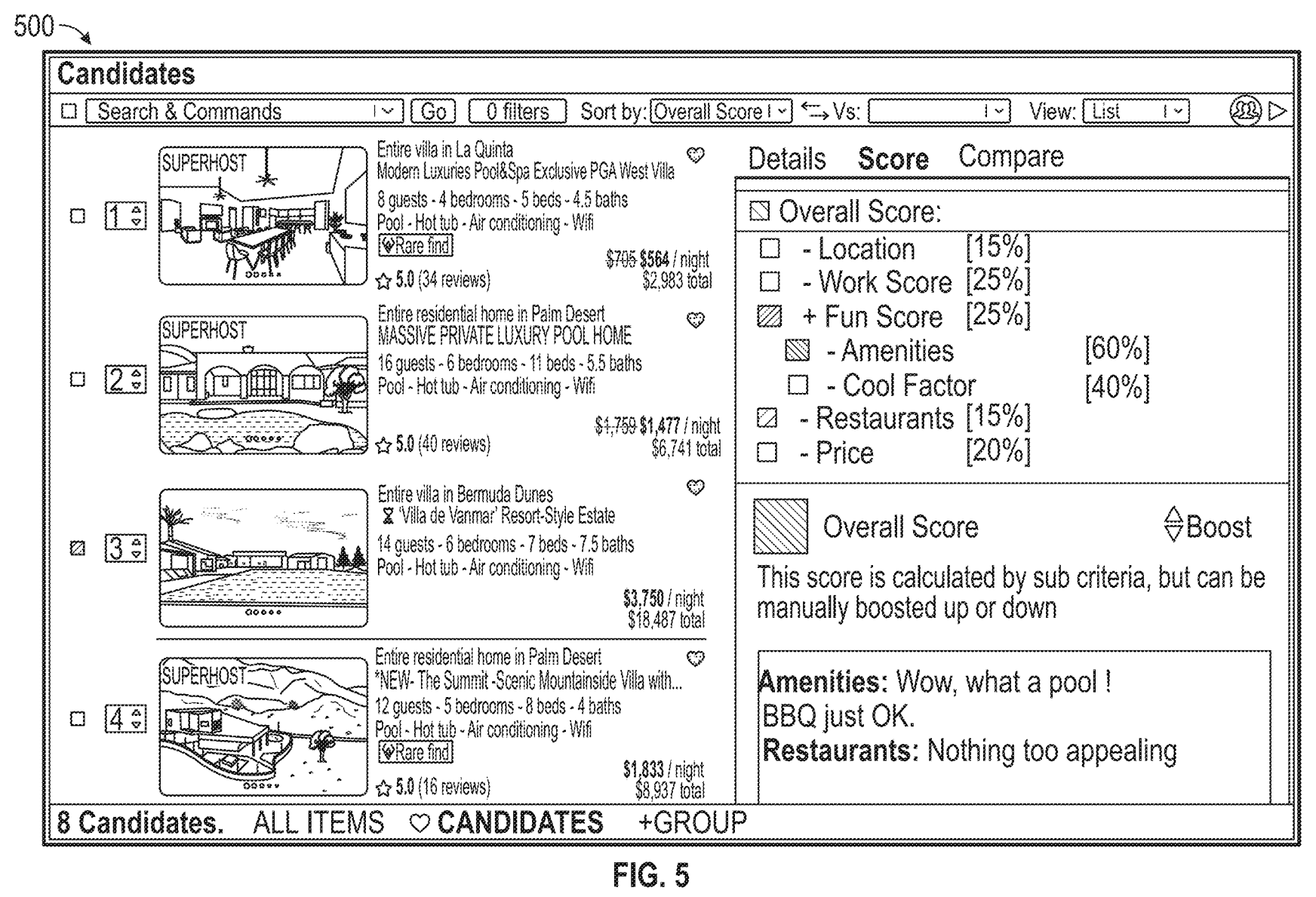

After the candidates are scored, the user is optionally enabled to modify the ranking of the candidates based on at least one preference, entered by the user, corresponding to at least one candidate, block 120. The system adjusts a candidate's ranking based on a user's emotional preference. For example, and without limitation, this may include the GamePlanner system 1810 moving the $3^{rd}$ highest scoring candidate house from the $3^{rd}$ position in the rankings to the $1^{st}$ position in the rankings because Alice felt that the house is spectacular, and so she grabbed this house's drag handle and drug the data record for the house from the $3^{rd}$ position to $1^{st}$ position, as depicted by FIG. 4. In another example, the GamePlanner system 1810 moved the $1^{st}$ ranked candidate house from the $1^{st}$ position in the rankings to the $3^{rd}$ position in the rankings because Alice felt that the restaurants nearby the house are not too appealing, and so she added a negative boost score to the house's overall score, which decreased the house's overall score from the highest overall score to the $3^{rd}$ highest score, as depicted by FIG. 5. A ranking can be a position in a scale of achievement or status. A preference can be a greater liking for one alternative over another or others.

For high-stakes decisions, the system user's identifying different criteria for each candidate may be a powerful and effective decision tool. However, this scoring process can require a non-trivial amount of time and effort to complete the process. For faster decisions, exploring the details about the candidate and then coming to an emotional gestalt can also be a satisfying approach for the system user. For example, a system user might conclude "I like this candidate more than that candidate." based on an emotional reaction to photos of the candidate houses.

The GamePlanner system 1810 can provide affordances that facilitate ranking of candidates; such as enabling a system user to drag candidates' data records up and down in a list of the candidates, allowing the system user to quickly move the best candidates to the top above lesser candidates, as depicted in FIG. 4. A voting affordance is another way for system users to indicate that they have considered the candidates from which they select a specific candidate as the highest ranked candidate. An additional way to facilitate ranking of candidates is by enabling a system user to rank candidates in groups of candidates first, such as initially ranking candidate houses in a "yes" group, a "maybe" group, and a "no" group, and then when the user confirms that the "yes" group is sufficiently large, only the candidates in the "yes" group need to be ranked.

The GamePlanner system 1810 can integrate rational scoring and emotional ranking together using the concepts of boosts and emotional overrides. The GamePlanner system 1810 activates a boost when the specified scores are computed based on the formulaic calculations described above, and parts of the scoring hierarchy may be augmented by a relative raising or lowering of the score, indicating that for this aspect, the overall score for a criteria or a score for a sub-criteria does not adequately record how the system user feels about the strength of that criteria or sub-criteria. FIG. 5 illustrates a boost affordance that is present for any calculated score based on criteria and/or sub-criteria.

For this example, the overall score is comprised of a linear weighted combination of scores from the sub-criteria for . . . , Price, Restaurants, such that the boost affordance enables the increase or decrease of the overall score by adding a boost factor to the calculated score to enable a special something not captured by the sub-criteria. Although this example describes adding a negative boost score to the highest level of the hierarchical weighted decision criteria, a negative boost score or a positive boost score can be added to any level of a hierarchy. As individual sub-criteria or the relative weights of sub-criteria are adjusted, the positive or negative boost factor remains, as the boost is additive to the calculated score.

Overrides are useful when a system user has assigned some of the scores that are contributing to the calculated computations, but the system user concludes that they do not want to take the time to assign all of the criteria or sub-criteria scores to generate an accurate score. Instead, since a system user can score as many or as few criteria and sub-criteria as the system user wants, the system user assigns an emotional score as an override to a specific criteria and/or sub-criteria, effectively replacing the partially calculated score with their emotional scoring. In this way, the overall score computed may be a hybrid, with some criteria and/or sub-criteria calculated by the formula, and the system user assigning emotional summary scores for other criteria and/or sub-criteria. FIG. 5 illustrates an example emotional boost based on a calculated overall score.

Figure 6:
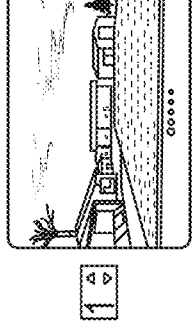
FIG. 6 illustrates example aggregated responses depicting average ranking and variance across participants for gameplans for improved decision making, under an embodiment.

Following the scoring of the candidates, the user is optionally enabled to modify the ranking of the candidates based on at least one score, determined by at least one other user, corresponding to at least one candidate, block 122. The system adjusts the ranking of candidates based on other users' scores. By way of example and without limitation, this may include the GamePlanner system 1810 sorting the list of the 8 Riverside County houses by an average ranking calculated from 5 recommenders who Alice invited to use the same hierarchical weighted decision criteria that she used to score these 8 candidates, to assign their own scores to the 8 candidates. Each score displays 5 colored squares that represent levels of agreement (green) to levels of disagreement (red) between the 5 recommenders' scores and Alice's scores, as depicted by FIG. 6. A score can be a number that expresses excellence in accumulated points and/or by comparison to a standard.

Illustrating the social aspect of decision-making, a system user is considering what other people think about the candidates that the system user is considering. Since many decisions usually involve other stakeholders, it is appropriate to have them share their insights about a decision or some parts of a decision.

The approach to integrating perspectives from other people relies on a key idea: a system user selects other people as recommenders who go through the same decision-making process as the system user, and then the GamePlanner system 1810 aggregates and integrates the recommenders' decisions in a way that visually highlights where there is agreement and where, and how much, there is disagreement. If a system user and the selected recommenders agree on a part of a decision, they do not need to spend any more time discussing that part, whereas if there is substantial disagreement on another part of the decision, then they need to carefully consider that part, possibly bringing everyone into alignment through more debate and discussion. The system user can accept the disagreement and make a choice one way or another, in effect saying "I understand that you don't agree with this part of the decision, but as the ultimate owner of this decision, I've heard your input, thought about it, and am going in a different direction for these reasons . . . "

To collect feedback from other stakeholders, team members, experts or anyone else, the system user can use three types of social polls. A system user can ask other people to contribute options to be considered by users of the GamePlanner system 1810. As options are submitted by a system user's selected recommenders, these options may be de-duplicated, merged, and evaluated to arrive at a set of candidates to consider.

When identifying which criteria are essential to generating scores of candidates, it is often advantageous to ask colleagues, stakeholders, or experts which criteria they think are important. A system user can also collect inputs on which criteria are most important and what the relative weights for the criteria might be, in the recommenders' judgement. Although invited recommenders may begin scoring candidates by using the same criteria and weights that the system user used to determine overall scores, in some embodiments the recommenders can use different criteria and/or different weights, and follow the determining of overall scores by grabbing the candidates' drag handle to drag and drop the candidates to new rankings, just like the system user could have done to reflect emotional rankings.

In response to reviewing a system user's candidates, the system user's selected recommenders can contribute their emotional rankings, their comments, and their scores/ratings using the methods described above. When creating a social poll, a system user can specify a data-table to receive the results from the selected recommenders, a set of instructions presented to poll recipients that lets them know what is expected of them, and possibly an expiration date/time that sets reminder notifications for all participants to encourage responses to be submitted within an expected time limit. The result of generating a social poll is a link that is distributed to the selected recommenders, such that when they access the link, they receive the instructions and the data required to make their recommendations. Once all the selected recommenders have submitted their recommendations or the specified expiration time has been reached, a system user receives a notification letting them know the recommendations may be evaluated.

The columns and rows present in the associated data table contain the structure used to receive recommendations from the social poll. In the case of a collect options poll, the GamePlanner system 1810 generates a form to enable stakeholders to manually enter values for all of the relevant columns in the table, and enabling the stakeholders to enter one or more rows representing options to be considered. In the case of collecting criteria and weights, the selected recommenders can review the existing column types of vote, rank, or score, and can propose additional missing criteria, which the GamePlanner system 1810 can then add to the table as columns. Additionally, a recommender can review and propose changes to the relative weights presented for each of the criteria and/or sub-criteria of a hierarchical score.

Finally, for scores and ranking polls, the selected recommenders can consider the candidates, which are stored as rows in a table, and rank the candidates using emotional ranking, rational scoring, or a hybrid of the emotional ranking and rational scoring. The data received from each poll respondent is recorded as being entered by the specific respondent. This enables the system user to either view the individual separate contributions from each poll respondent, or else view an aggregate that presents the combined data from all poll respondents.

When presenting an aggregate view, the GamePlanner system 1810 displays two elements. The first displayed element is an average score that may be used to sort the candidates in terms of what most people think of the candidate listed in the corresponding row; while the second displayed element is a variance score, which indicates how much discrepancy of opinion there is among the respondents about the candidates In the situation when half the respondents think a specific candidate is the best option, and the other half of the respondents think the same candidate is the worst option, the average is a middling score, whereas no one thinks the candidate is a medium option, as half of the respondents love the candidate and half of the respondents hate the candidate. Without the variance, this important candidate would likely just get lost in the middle of the other ranked candidates. One way of conveying the average and variance components is displayed in FIG. 6.

The GamePlanner system 1810 can sort the list of candidates by an average ranking calculated from multiple social participants using the hierarchical weighted decision criteria. This decision-making process moves the average best candidates to the top, but with color scores (dark green=highly liked, red=highly disliked), which provide a range of the views of a system user's selected recommenders. For instance, most selected recommenders rated candidate #2 very highly, whereas one recommender was not happy with candidate #2 at all.

By looking at the color bars next to the hierarchical criteria, it is easy to understand visually where there is agreement and where there is no agreement. FIG. 6 illustrates an example of aggregated responses depicting average ranking and variance across participants. A system user who requested a gameplan document, scored the criteria to generate the overall scores, and then invited recommenders to use the gameplan document to generate and then share their own overall scores, can have the GamePlanner system 1810 process the system user's overall scores as if the system user was just another recommender, thereby aggregating overall scores and then generating the average ranking based on the aggregated overall scores.

The system outputs a set of candidates, ranked based at least on the corresponding scores, as the options for making the decision, block 124. The system outputs an identification of the highest scoring candidate(s) as options to consider in making the decision. In embodiments, this may include the GamePlanner system 1810 outputting a map of some of the 8 Riverside County houses for sale which are projected to provide a good return-on-investment, with the highest-scoring house depicted at the top of a list of houses ranked by overall scores, and suggested as a purchase for Alice. When the GamePlanner system 1810 outputs a list of ranked candidates available for a system user to consider as options, each option may be described in detail to assist the system user to decide whether to choose the highest-ranking candidate or any of the candidates that are ranked nearly as high.

The list of ranked candidates output by the GamePlanner system 1810 may be ranked, sorted, and/or filtered based on the highest overall score generated by scoring and weighing criteria followed by filtering and sorting these criteria scores, such as the best return on investment balanced with the optimal house price, or based on filtering and sorting data records' values, such as the cheapest house price that has a sufficient return-on-investment. The GamePlanner system 1810 can group scored candidates in groups and score these groups. For example, the GamePlanner system 1810 can group the scored candidate houses based on counties, score the groups of houses based on the data aggregated for each county, and then rank the groups based on each county's scores, such as ranking the Riverside County houses higher than the San Diego County houses and the Los Angeles County houses based on the average overall scores for these groups of houses.

Once the system user has completed the scoring process and found an equilibrium that seems to be right, the gameplan document displays not only the highest-scoring option that becomes the answer for the decision, but also an ordered list of fallback options. After viewing the overall scores for the candidates, if the system user selects a decide button that indicates the final decision, then the GamePlanner system 1810 freezes all of the data records, scores, and rankings to generate a summary of the decision-making process, as the scores and the weights produce an explainable and explorable interface about the decision. Consequently, the system user has a clear and precise understanding about how the decision-making process came to the answer. If the system user is not ready yet to make a decision, the system user can revisit the data sources to refresh the data or select an update button to refresh the data, until the system user is ready to make a decision or choose to not to select any of the system user's candidates.

If after the GamePlanner system 1810 froze all of the data records, scores, and rankings to generate a summary of the decision-making process, and the system user discovered that the highest-scoring option that she selected was no longer available, she could instruct the GamePlanner system 1810 to un-freeze and refresh all of the data records, scores, and rankings so that she can identify and select the remaining option that currently has the highest overall score. The GamePlanner system 1810 learns from any decisions made by the system user, including a decision to not decide on any of the candidates, and uses the learning to suggest revisions of criteria and/or weights for future gameplan documents which are related to the current gameplan document and/or to the current system user. For example, after learning that Alice assigned one of the lowest weights to the criteria for the purchase price for a home, when Alice requested a gameplan document that involved purchasing a car, the GamePlanner system 1810 reduced the gameplan document's criteria weight for the purchase price of the car.

Although FIG. 1 depicts the blocks 102-124 occurring in a specific order, the blocks 102-124 may occur in another order. In other implementations, each of the blocks 102-124 may also be executed in combination with other blocks and/or some blocks may be divided into a different set of blocks.

The approach to decision making includes balancing and aligning different views, across emotional, rational, and social aspects. One innovation to aid in this goal is an automatic weight optimization algorithm that can automatically determine the optimal weight adjustments to best align two different rankings based on the hierarchical weighted decision criteria described above. Such rankings might be produced by rational scoring against emotional preference rankings, or rankings provided by different people, or rankings calculated at different times, such as a system user might weight a criteria differently in retrospect than originally. For example, given a list of candidates, a system user examines each candidate one at a time, researches the candidates, scores a number of the criteria and sub-criteria presented, and then drags a candidate above or below other candidates depending on how the system user judges the candidate overall compared to other candidate, moving the perceived best candidate to the top of the rankings, and moving the perceived worst candidate to the bottom of the rankings. After completing this process for all candidates, they all have scores on each criteria and sub-criteria, as well as relative overall rankings against other candidates.

Using the hierarchical weighted decision criteria, the GamePlanner system 1810 may generate a second ranking for the candidates. Sometimes, the two ranked lists align perfectly and the decision is clear. However, other times the two rankings reflect different values, with the hierarchical decision criteria representing the bottom-up or analytical ranking, and the preference ranking representing the top-down or emotional ranking. Using a stochastic gradient descent search, or similar methods, through the weights, an algorithm can determine what minimal clarifying changes may be made to the hierarchical weighted decision criteria's weights to bring the two rankings into alignment as closely as possible. Highlighting the weighted criteria that should be changed is extremely valuable to clarify why the two rankings are not aligned.

For example, a system user used to drive motorcycles but now has a family and wants to own a more sensible and safer mode of transportation. The system user creates three decision criteria for scoring a number of car candidates, safety, style, and price, and then sets weights according to how important the system user thinks that these three criteria should be, with safety weighted as the most important criteria, then the style criteria, and finally the price criteria. As the system user reviews each car purchase candidate, he assigns scores for the three criteria, and then based on his feelings, ranks the candidates based on which one he felt was the best for his needs. At the end of this process, the GamePlanner system 1810 calculates a ranking from his scores and weights, compares this new ranking with his own emotional ranking, and learned that the rankings differed greatly.

When the system user executed the automatic weight optimization algorithm, the iterative algorithm determined that the rational "bottom-up" rankings and the emotional "top-down" rankings could be brought closely into alignment if the weight on the safety criteria was lowered. Provided with this information, the system user realizes that he emotionally prefers all the fastest cars, which are not very safe, even though he originally wanted a safe car—his head and his heart were truly not in alignment. Now there was an explicit decision to be made, to either realize that safety is more important and move the fast cars lower in the ranking, or else make the conscious decision to take a risk and lower the priority of the safety criteria.

The automatic weight optimization algorithm for alignment can be a useful tool that enables an iterative "bottom-up" process and an iterative "top-down" process which helps align the "rational" rankings and "emotional" rankings, respectively, in a way that enables a user to arrive at a concluding decision that captures all of the user's requirements and intuitions. The "bottom-up process can be considered a rational process, in which a user selects the criteria and weights which are important, and produces the rankings from the mathematical calculations of the hierarchical weighted decision criteria. The top-down" process can be considered an emotional process, in which a user ranks overall items by gut feel, without knowing precisely the criteria that contributed to this ranking.

As an example, an insight may be derived from when a basketball coach first loaded statistics for all of the best basketball players in history into a gameplan table. That coach strongly believes the top three basketball players in history are Michael Jordan, LeBron James, and Kareem Abdul Jabbar, in that order, so he places these three players on the top of the list in the table. However, the coach may not be quite sure why those three players were on the top of his list, so he can execute the automatic weight optimization algorithm for alignment and automatically determine which criteria and weights most concisely result in that order of the rankings.

The executing algorithm determines that if the coach selected Points Per Game, Plus/Minus score, and Win-Shares with appropriate weights, these are the metrics that best represent his selected players' rankings. However, based on these statistics alone, Karl Malone would be ranked as the fourth best player of all time, and that does not comport with the coach's emotional rank for Malone relative to history's greatest basketball players. In addition, the coach believes strongly that winning NBA Championships must be part of the definition of the greatness in basketball since the objective of the sport is to win the championship.

The coach does not want to disturb the work that he has accomplished so far, so he "locks in" the first three players and the three criteria that he had selected so far, so that the top three ranking and the criteria will not be disturbed by the automatic weight optimization algorithm for alignment. The coach added the statistics for NBA championships and free-throw shooting, because great players need to be able to shoot well, as additional criteria, and then reviewed the newly calculated ranking. All though the newly calculated ranking seems more appropriate, there are still some problems farther down the list because James Harden maybe should not be ranked in the all-time top ten because he does not play defense. Consequently, the coach added "All Defensive Team Selections" as a weighted criteria, which results in a more appropriate top ten.

The coach can lock in his sub-decisions at that point in time to provide constraints to the algorithm. Still, in the coach's estimation, Larry Bird should be above Tim Duncan or Kobe Bryant, so he moved Bird up on the list, based on emotional ranking. The automatic weight optimization algorithm for alignment iterates to identify the appropriate weights to best fit the rational and the emotional components that the hoops coach provided.

Through this iterative process, the coach has created a selection order that balances his "top-down" emotional feelings, such as identifying "Michael Jordan as the best," with his "bottom-up" rational requirements, such as "NBA Championships matter." When both the "bottom-up" and the "top down" aspects are deemed to be true, the basketball coach now has a concrete mathematical explanation that provides the satisfaction derived from having analyzed the problem from all angles. The coach now understands the rational of why and how he came to the decision, what aspects were important, and how he can now move forward with confidence that he has achieved his optimal decision.

The algorithm does not indicate which alternative to choose, as this choice is for the system user to make, but the algorithm greatly helps by highlighting which issue(s) to address. By encouraging the system user to make an explicit decision, this insight provided by the algorithm gives the system user a sense of completion in that he has now considered the car purchasing decision from several different angles, thought about what was important, and now knows exactly what the basis is for his decision. If the system user revisits a decision later armed with such hindsight, the system user may learn how to make better decisions over time, saying "I should have listened more to my heart," or the other way around.

Different decision types require different actions. Some high value decisions such as buying a house or choosing a college require much thought and deliberation. For those cases, much of the content above is directly relevant. However, for some high frequency use cases, such as deciding what to have for dinner tonight or choosing a movie, a quicker decision process is required since no one wants to spend a lot of time making a decision that has little consequence if they do not make the optimal choice. Still, high-frequency decisions provide the opportunity to learn personalized statistics about a system user, and the system can provide value to this user by leveraging this learning to make predictions that make the decision process even faster and easier for the system user.

In a use case which occurs every night, a system user needs to decide what to eat for dinner. In this case, she has a fixed set of recipes to choose from, or the options to occasionally go out to dinner or add a new recipe. The recipes may be entries in a data table with the following information: dish name, cuisine style, main ingredients, and preparation time. Every night, the system user uses the system to predict what to eat for dinner. The system's user interface presents the dish that is predicted, and gives the system user the option to accept the predicted dish or to skip to the next best choice predicted by the system.

One approach that could be tried would be to use traditional machine learning techniques, such as recurrent neural networks augmented by a time-loop so that patterns may be learned over time. Genetic algorithms could also be used for predictions of this type. However, both of these techniques require huge samples of data, perhaps in the hundreds of thousands or millions of examples, which is not relevant for this type of problem. What is needed is a method that works with very few training or feedback examples.

This method relies on statistics across the individual items and across learned rules. It works like this: in the initial state, all options, such as current recipes, restaurants, and new recipes, are given equal probability, and there are no rules. Hence, each option is as likely as another to be predicted by the system.

As options are selected over time, the GamePlanner system 1810 counts how many times each predicted option has been selected, which is balanced with the number of times a not-predicted option has been selected. For example, the very first time that the GamePlanner system 1810 makes a prediction, when there are no previously selected options, the GamePlanner system 1810 randomly selects a previously non-selected option because in this case, all probabilities are equal, given that there are no rules learned yet. The second time, the GamePlanner system 1810 assigns a 50% chance to the previously selected option, and assigns a 50% chance to any one of the options which have yet to be selected.

The GamePlanner system 1810 learns rules to tune across the selected options, looking at the pattern of sequences of previous options coming before it, and also at external criteria such as the day of the week. Examples of the type of rules that the GamePlanner system 1810 may learn are Friday is much more frequently attributed to (main ingredient=fish), never have (main ingredient=fish) two days in a row, usually have (cuisine style=italian) two days after (cuisine style=mexican), and a new recipe gets selected on average every 45 days.

As the GamePlanner system 1810 learns rules, it keeps statistics on the rules to determine how often the rules are likely to be true. The GamePlanner system 1810 applies rules to higher or lower the probabilities of results from the previously selected set of options, whose probability is based primarily on statistics. The GamePlanner system 1810 also applies rules to boost the probability of unseen options, whose probability is randomly selected, due to no prior probabilities. Over time, more data is available, and the predictions get better and better, saving the system user precious decision time.

The goal of a command acceleration bar is to provide a discoverable interface that enables a system user to move a step forward in accomplishing a task, in a way that guards against user error, and provide handrails that walk the system user through a task in a graphical way. Using the autocomplete interface both expands a system user's understanding of what is possible with the services and data sources available in the GamePlanner system 1810, and also constrain the system user's input to that which can actually be executed. The command acceleration bar may be used in several places in a graphical user interface, such as in the main header pane of the website for the GamePlanner system 1810, as an embedded action component inserted into a gameplan document, and as a context menu in a table component.

If the top-level autocomplete in the main header pane is used to execute an action that returns a document, the GamePlanner system 1810 opens the document in a new top-level tab. If the executed action returns a table, the GamePlanner system 1810 creates a new document at the top-level tab containing the returned table. If an action is executed from within a document, in an embedded action component or a context menu, and if the action returns a document, the GamePlanner system 1810 inserts the document context into the existing document at the closest point below the execution of the action. If an action is executed from within a document, in an embedded action component or a context menu, and if the action refines the current table, which is associated with an embedded autocomplete or context menu, then the GamePlanner system 1810 updates the table in place and adds the action to the table's history. If an action is executed from within a document, in an embedded action component or a context menu, and if the action refers to a new table, then the GamePlanner system 1810 inserts the new table in the document at the closest point below the execution of the action.

The following descriptions differentiate between which items are accessible from a command acceleration bar's autocomplete menu, and which items are not accessible from a command acceleration bar's autocomplete menu. Documents are accessible by name from a command acceleration bar's autocomplete menu. Since undefined documents are not indexed, any undefined documents are not accessible from a command acceleration bar's autocomplete menu. Similarly, any documents or content stored under an archived folder are not accessible from a command acceleration bar's autocomplete menu.

If a table is created in a document by a system user and given a name, which is not the name "undefined," the table is in the table of contents for the document and is searchable by the command acceleration bar. If a table is created with an automatically generated header, such as selected as the result of the copy selected items to a new table action, or as Yelp find restaurants as the result of a service invocation, that does not constitute a named table, unless a system user specifically changes the name to something that the system user selected. After selecting the table name, a system user can continue auto-completing on the column filters as sub constraints.

Additional items which are accessible from a command acceleration bar's autocomplete menu include a provider, a service, an action, and a tag. A provider is a company like Yelp or Google or GamePlanner that offers services and actions. Services are optional intermediate categories between a provider and an action. For example, Google is a provider that offers multiple services, such as Gmail and Google maps, and actions are organized under each service, such as Google maps get directions.

Actions include both the provider name and the action name, such as Yelp find restaurants, and Yelp reserve restaurant. After selecting an action, a system user can continue auto-completing on pre-search inputs and post-search table columns. Tags may be auto-completed on both the tag name, such as in-folder, and the tag value, such as the type "gameplan." The GamePlanner system 1810 may use tags to filter down other resources, such as tables, services, and documents when searching or auto-completing. Typed terms can execute a full-text search and match documents containing that term in them, and then a form of a snippet extract depicts an explanation of the match.

A command acceleration bar enables a user of the GamePlanner system 1810 to efficiently execute commands, such as by entering characters into an autocomplete field and by selecting suggested command options depicted below the autocomplete field. When the cursor is in the autocomplete field, a list below the autocomplete field provides a set of commands and queries that may be selected at that point in time. The set of commands are ordered based on a notion of likelihood, as calculated by frequency measures or some manual indicators.

Each depicted command includes hierarchical information, so that a user can select from any level of the command hierarchy. As depicted below, the example command acceleration bar prompts a user to enter characters into the autocomplete field or select from some of the most frequently executed commands, which are identified by home, work, or marketplace (MktPl) in the first hierarchical level, and food, movies, startup, and travel in the second hierarchical level. The commands which include food in the second hierarchical level are available from both the home commands and the marketplace commands in the first hierarchical level.

| | Go |
|---|---:|
| Home> Food> Adam: Dinner & Movie | |
| MktPl> Movies> Netflix: Find Movies | |
| Work> Startup> People: Employees | |
| Home> Food> Adam: Favorite Recipes | |
| Work> Startup> Product: Features | |
| MktPl> Food> Yelp: Find Restaurants | |
| MktPl> Food> OpenTable: Reserve Restaurants | |
| MktPl> Food> OpenTable: Find Restaurants | |
| MktPl> Travel> Expedia: Reserve Flights | |

As depicted by the command acceleration bar below, if a system user begins to type letters, such as the letters Re, the command acceleration bar filters the suggestions based on the typed letters matching the first letters of the word, such as the words recipe, restaurants, and reserve.

| Re | Go |
|---|---:|
| Home> Food> Adam: Favorite Recipes | |
| MktPl> Food> Yelp: Find Restaurants | |
| MktPl> Food> OpenTable: Reserve Restaurants | |
| MktPl> Food> OpenTable: Find Restaurants | |
| MktPl> Travel> Expedia: Reserve Flights | |

A system user can select any level of the hierarchy of a command or query. If a system user selects food in the example list above, the system user sees all results matching MktPl>Food, such as all folders and resources below. If a system user selects an action, the GamePlanner system 1810 adds a button to the command bar, to compactly represent the action, such as Yelp, and all the selected constraints, which are depicted in parentheses in the button's label, such as (0).

As depicted in command acceleration bar below, the name of the service is listed in the autocomplete popup menu, such as Yelp Find Restaurant, along with the number of constraints added, such as (0), in a link. Below that link, all constraints are displayed, such as near, cuisine, price, and serving, offering a complete discovery of what is available. Optional arguments are italicized, such as location, style, op, price range, and dish, while required arguments are depicted in normal font.

| Yelp (0) | Go |
|---|---:|
| Yelp: Find Restaurants (0 constraints) | |
| ... near [*location*] | |
| ...cuisine [*style*] | |
| ...price [*op*] [*pricerange*] | |
| ... serving [*dish*] | |

At this point, a system user can either select a constraint using a mouse, or may begin to select the constraint that the system user wants to add. As a system user types, such as the letter "c" illustrated in the command acceleration bar below, options are filtered out. If only one command remains, such as cuisine, selecting <tab> results in selecting the command and moving to display the next step.

```
Yelp (0) c                                                  Go
    Yelp: Find Restaurants (0 constraints)
        ... near [location]
          ...cuisine [style]
            ...price [op] [pricerange]
        ... serving [dish]
```

When a system user selects a constraint, such as cuisine, the GamePlanner system 1810 adds a constraint button to the text input field, such as the cuisine button, and if the first argument is of the type "enum," its values are listed to be auto-completed. Continuing to type, such as the letter "i," results in filtering the list to matching items, such as Italian. If only one command remains, such as Italian as shown in the command acceleration bar below, a <tab> selects the command and moves to the next step.

```
Yelp (0) cuisine i                                          Go
    Yelp: Find Restaurants (0 constraints)
        ...Mexican
        ...French
        ...American
        ...Italian
        ...Chinese
        ...Japanese
```

Once the value for the constraint has been specified and confirmed using <tab>, the constraint disappears from the text input box, and the number of constraints added is incremented, such as from (0) to (1), and the GamePlanner system 1810 removes the selected constraint from the list of constraints in the menu as shown in the command acceleration bar below. The system user may repeat this process as many times as the system user prefers to add the constraints that the system user needs.

```
Yelp (1)                                                    Go
    Yelp: Find Restaurants (1 constraint)
        ... near [location]
            ...price [op] [pricerange]
        ... serving [dish]
```

If a system user wants to see or edit previous constraints, the system user selects the Yelp button or the (1 constraint) link in the menu, and a second menu appears, listing all previous constraints, such as cuisine and serving. This is illustrated in the command acceleration bar below:

```
Yelp (2)                                                    Go
    X   Yelp
    X   Find Restaurants
    X       ...cuisine Italian
    X   ... serving lasagna
```

Selecting an X removes the corresponding constraint and all hierarchical children below the constraint. As illustrated in the command acceleration bar below, selecting a specific constraint, such as cuisine, provides that constraint in the auto complete so that the value for the constraint may be changed, such as to Mexican, French, American, Italian, Chinese, or Japanese.

```
Yelp (2) cuisine                                            Go
    Yelp: Find Restaurants)
```

-continued

```
        ...Mexican
        ...French
        ...American
        ...Italian
        ...Chinese
        ...Japanese
```

When a system user is ready to execute a request, the system user can select <enter>. If a single data source or service has been selected by the autocomplete criteria, the grid for the data source is added in the appropriate document, or the service is executed, prompting a system user for missing required arguments in a modal form, and then depicts the results of the executed request in the appropriate document. If multiple data sources or services match the criteria, a modal box requires that a system user selects a single data source or service. The behavior and target of an action depends on the type of the result returned. When the results of an executed request produce or refine a document, such as by entering "help," the document is opened or selected in the top-level tab view.

The results of an action autocomplete can produce or refine a table: If an action produces a table for the first time, the GamePlanner system 1810 inserts an associated autocomplete bar before the table to allow successive refinements, if the bar is not already present. The GamePlanner system 1810 sets the name of the table tab to the name of the data source or the language from the top level autocomplete used to invoke the service, such as Yelp find restaurants. If the action refines an existing table, the GamePlanner system 1810 adds the action to the table's history list that is viewable by a system user.

To join two tables, a system user can begin on one of the tables, select to bring up a context menu, and select more actions to bring up a modal autocomplete widget. FIG. 7 illustrates an example modal autocomplete widget 700 for gameplans for improved decision making, under an embodiment. The GamePlanner system 1810 displays the modal autocomplete widget after the selection of more actions from a table context menu.

If a system user selects add <resource-name>, the GamePlanner system 1810 returns all columns by the table or adds the service as columns to the source table, adds data records as new rows, and as best as possible, executes a JOIN operation to identify rows from the source table and rows from the destination table that are referring to the same row, and then merges the two rows into one row when appropriate. Entering add <column-name(s)> from <resource-name> provides the same result, but hides columns other than those requested in the destination table.

In order that the combined row does not become too long, it is important that a system user can easily create columns or groups of columns which may be visible or hidden. Additionally, it is desirable to be able to freeze a column so that as a system user scrolls horizontally for other columns, the frozen column is always shown. If filters or inputs are set in the first table and may be reused when loading the destination table from a service or a discoverable table, the filters carry over to select results to be more accurately added in the destination table. When selecting a column header, the sort mode toggles among three states: sort ascending, sort descending, and default sort order. In sort ascending order, any blank values in that column are sorted to the bottom, while in sort descending order, any blank values are sorted to the top.

After a join operation, the default sort for the combined data table is defined as: Joined rows, with results from both tables listed first, preserving the relative order of the data records from the initial source table, followed by the source table's rows that could not be joined, in their relative order from before the join operation, and followed by the destination table rows that could not be joined, in their relative order, as returned from the action call.

To be able to distinguish between columns from the source table(s) and the destination table, the column names in the header tabs are colored differently by source. A legend is accessible to show what sources are involved in the table merge, and what colors are associated with each source, and the GamePlanner system 1810 places that legend in a modal popup inside of the table properties affordance in each table, but may place the legend elsewhere. To execute a join, columns with the property identity are used to perform identity inference to determine whether two rows from two different tables are referring to the same entity. The inference process is as follows:

First, any identity columns in the source table are matched with identity columns in the destination table, as best as possible. Equality, such as "address"="address," and substring, such as "Restaurant Name"="Name," may be used. Similarity may be used to combine data records, such as combining the data records for "Joe's bar" and "Joe's restaurant," or "123 Main St." and "123 Main Road." However, similarity may not be used to combine columns, such as the column for Trip Advisor's rating and the column for Expedia's rating.

The column type must be identical for two matched columns. If no column is marked explicitly as having an identity property, the first (left-most) column found in a gameplan document table is marked as an identity column. Based on the types of the column pair, calculations are made to determine if the values of a source row match values of a destination row. If all identity columns match, the rows are auto-joined.

Fuzzy comparison using hamming distance produces more than a 75% match, or whatever number works well in practice. Locations, such as addresses and latitude/longitude pairs, must be accurate to within 1 mile, or whatever distance works well in practice. Phone numbers must exactly match once all non-numeric characters are removed. All other types must exactly match.

Although the GamePlanner system 1810 attempts to accurately determine when two rows from different sources are the same, it is impossible to achieve perfect results. As such, a system user can link together two rows that were not identified as being related to the same concept, and can detach a link erroneously constructed between two non-related concepts. These are performed by the autocomplete action join (two selected rows as arguments) and the autocomplete action separate (one row as an argument). An action lookup specifically searches for a particular row in all joined tables. A limit of 10 lookup actions per table per source is enforced to minimize overuse of this feature.

When a system user wants to verify that joins have happened correctly, the GamePlanner system 1810 provides an interface that helps compare source and destination rows efficiently. Several such interfaces, including AG Grid's Tree view, would suffice, as would aligning A and B rows underneath each other for easy comparison. A system user can select the freeze column feature from a command acceleration bar so that the system user can lock in a left-most column or columns and then scroll to see columns from other tables without losing focus on the left-most column(s).

A system user can filter a gameplan document table's rows by selecting quick search, which scans all data for a given search string, or by opening a graphical pane from the left side of the table and filtering rows by adding specific constraints for searchable table columns. FIG. 8 illustrates an example filter pane 800 and quick search widget 802 for gameplans for improved decision making, under an embodiment. In FIG. 8, the filter pane 804 is opened on the left side of the table, and the quick search widget 802 is in the upper right corner of the table.

The default view for a gameplan document table is a grid, but other views are possible, depending on the contents of the table. View options include a calendar view if a table's rows include date/time columns, a map view if a table's rows include a latitude and longitude column or an address column, and a chart view if a table's rows include a numerical data column. View options also include a form view, used to collect poll data from a system user's recommenders, if defined for a table's rows, a gallery view with each card depicting the summary view of a data record and a way to access details for the data record, and a list view depicting data in a way that may be shown in a long list.

When a system user inserts a table into a gameplan document, the table has an enclosing tab layout component around it. That way, if a system user creates an additional view of the table, such as a chart view, the system user can use the layout component to arrange how to depict both a grid view and a chart view, such as in tabs or other layouts. When a table grid is inserted into a gameplan document, the table grid is not resizable because its fixed height is designed to only take up a modest portion of a gameplan document's view-height. A maximize button can enable the tab pane layout to expand to the full window size so that a system user can explore the data and associated views more fully.

Figure 9:
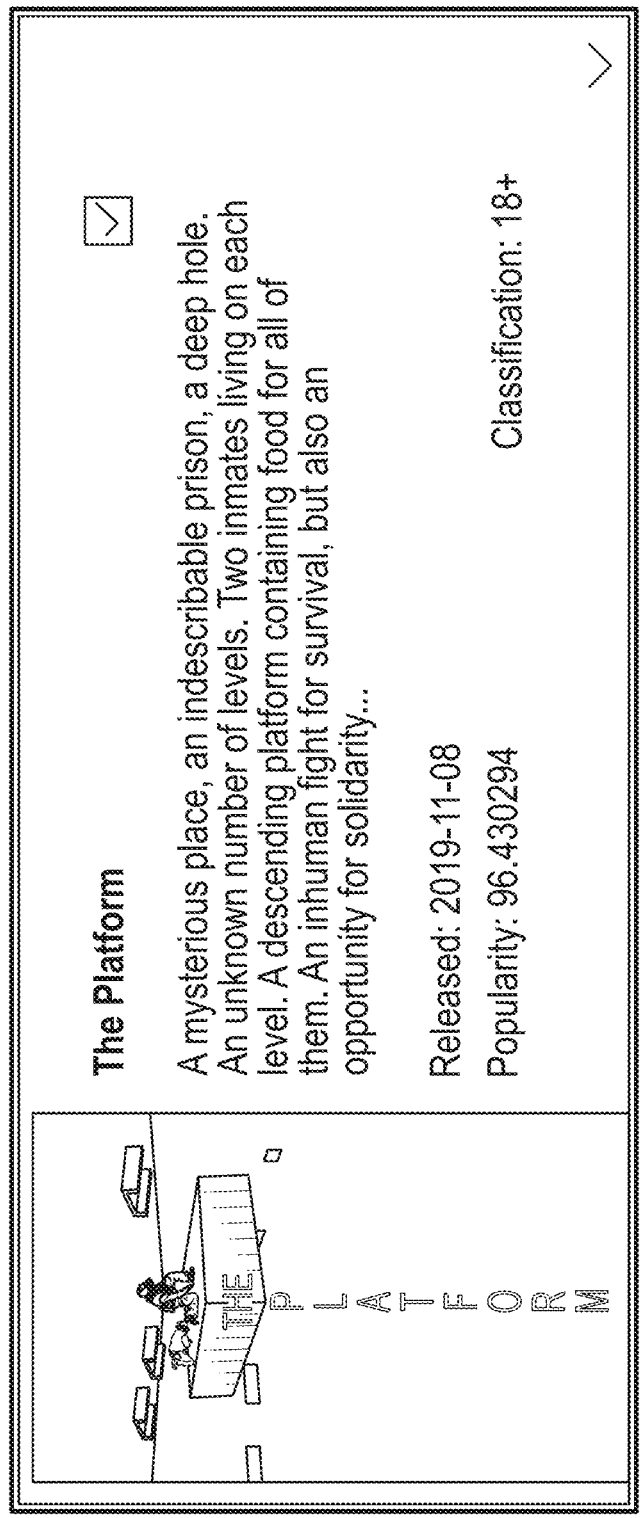
FIG. 9 illustrates an example list view for gameplans for improved decision making, under an embodiment.

Horizontal cards stacked into a vertical list view can depict a summary of a data record. Any type of system user clicking on a down arrow opens the card to depict details of a data record in an expanding toggle that alternates between depicting the details of a data record and hiding the details of the data record. FIG. 9 illustrates an example list view 900 for gameplans for improved decision making, under an embodiment.

A gallery view may be a horizontal gallery view of cards with summary slots for a data record, and may be depicted on a minimalist visual view. As a system user slides a gallery view horizontally, the selected card enlarges, and the de-selected card shrinks. Selecting the down area on a card opens a detail view for the corresponding data record.

Figure 10:
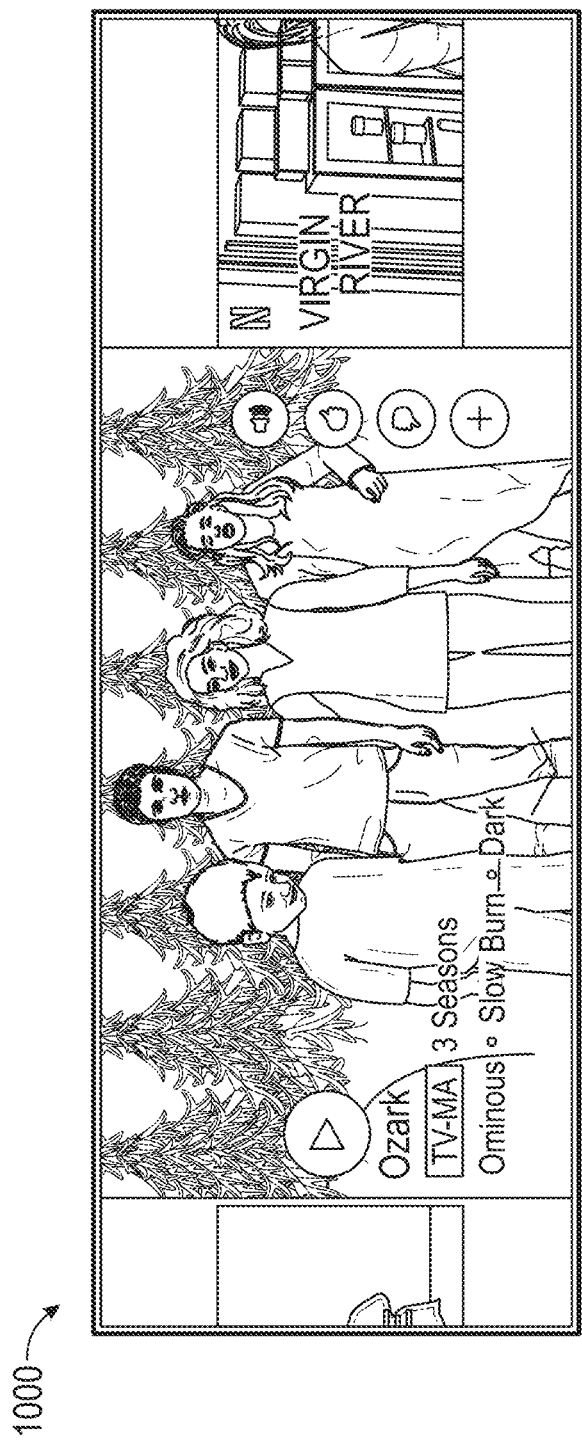
FIG. 10 illustrates an example gallery view for gameplans for improved decision making, under an embodiment.

FIG. 10 illustrates an example gallery view for gameplans for improved decision making, under an embodiment. By default, various card views have a few predefined slots, and an algorithm attempts to determine which columns in a corresponding gameplan document table should be assigned to those predefined slots. However, if a system user wants to customize a card view, a simple view editor enables the system user to specify the user interface components for the card view and which data record columns map to the card view's slots or fields.

Figure 11:
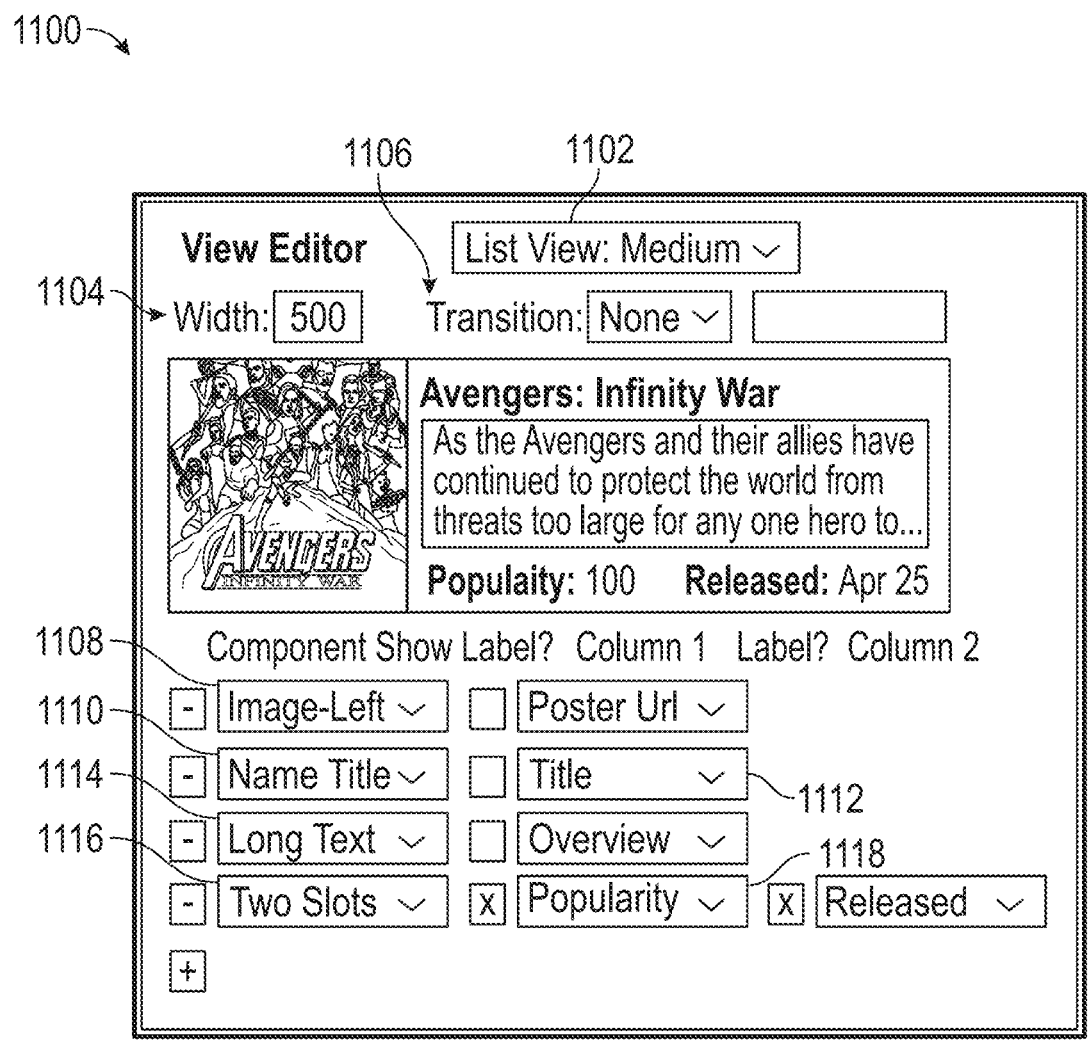
FIG. 11 illustrates an example view editor for gameplans for improved decision making, under an embodiment.

To launch the view editor, a system user can select edit views from a table menu, under a views sub-menu. FIG. 11 illustrates an example view editor 1100 for gameplans for improved decision making, under an embodiment. The first part of the view editor 1100 is a pulldown 1102, which indicates the views that may be edited, such as list view:

medium, gallery view: small, gallery view: medium, gallery view: large, and map view: small. A system user can use the view editor 1100 to define a view based on a width 1104 in pixels, a transition 1106, and a list of user interface components, along with related associations to specific columns in a gameplan document table of data records. The view editor 1100 can depict a live preview of the corresponding view, using the first row from a table of data records.

The transition box indicates how other system users can move from the current view to another view. The transition type can have three values: none or no transition, button, and hover. For button and hover transitions, a system user can use the view editor 1100 to specify the name of another view to transition to. For instance, a gallery small view uses a hover transition to transition into depicting a gallery medium view, and the gallery medium view uses a button transition to transition into depicting a gallery large view.

A system user can use the view editor 1100 to add a list of user interface components to define any view. The image-left 1108 user interface component is a left-aligned image panel that can be added, for any view, next to the main text content. If a system user does not use the view editor 1100 to select an image-left 1108 user interface component for a view, then all other non-image user interface components appear within the text panel. Using the view editor 1100 to add an image-left 1108 user interface component to a view also adds one associated column mapper, and lists all table columns of the type imageColumn for association.

If a system user uses the view editor 1100 to add an image-top user interface component on top of the main text content in a view, the view editor 1100 adds one associated column mapper, and lists all table columns of the type image column for association. A system user can use the view editor 1100 to create a view that includes both an image-top user interface component and an image-left user interface component, as depicted by the block example below:

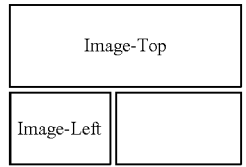

After a system user uses the view editor 1100 to create an image-left 1108 user interface component for a view, the view editor 1100 does not depict an option to create another image-left user interface component for the same view. Similarly, after a system user uses the view editor 1100 to create one image-top user interface component for a view, the view editor 1100 does not depict an option to create another image-top user interface component for the same view.

A system user uses the view editor 1100 to set a name title 1110 to a title 1112, which may be depicted in a horizontal weighted slot that spans the entire width of the text pane. Columns of the type nameColumn are available in the associated column selector. A system user uses the view editor 1100 to select longText 1114 as a horizontal three-row height text field spanning the width of the text pane. Columns of the type longTextColumn are available in the associated column selector.

A system user uses the view editor 1100 to select two slots 1116 to be a left-aligned slot and a right-aligned slot arranged horizontally. Columns which match most other types of columns appear in two associated column selectors, such as columns for text, date and time, number, currency, etc. which is everything except for long text, image, or identifier. A system user can use the view editor 1100 to select one slot to be a left aligned slot.

Along with each slot definition associated with a component, there is a show label checkbox. If this checkbox is checked for a column, then the slot is filled with the column name: <row value>. If the checkbox is not checked, the slot only depicts the row value. For example, a system user uses the view editor 1100 to define a two-slot 1116 component where the popularity 1118 column is checked and the rating column is not. This definition is depicted below:

| - | Two slots | ∨ | Popularity | ∨ | Rating | ∨ |

Figure 12:
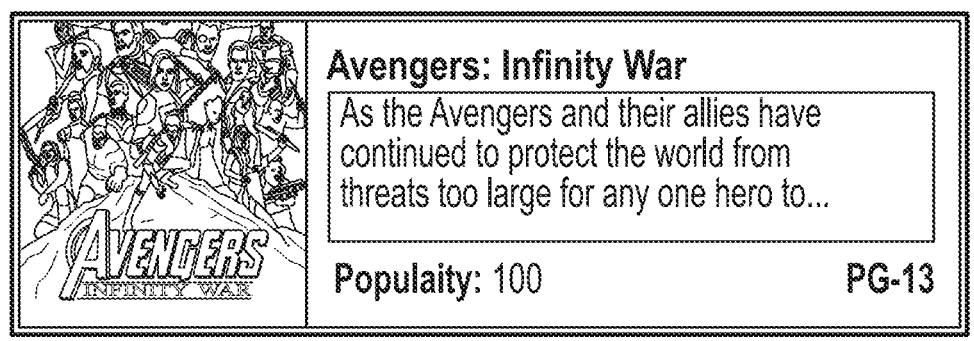
FIG. 12 illustrates an example two-slot component view for gameplans for improved decision making, under an embodiment.

The definition produces something that is similar to the depiction of FIG. 12, which illustrates an example two-slot component view for gameplans for improved decision making, under an embodiment. The popularity show label checkbox is set to true, but the checkbox is not set to true for the rating (PG-13).

Figure 13:
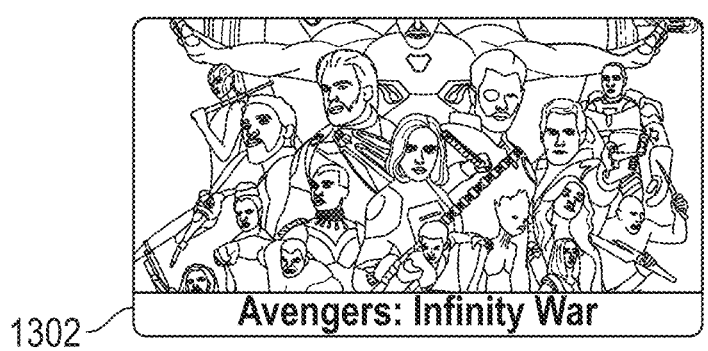
FIG. 13 illustrates an example small gallery view for gameplans for improved decision making, under an embodiment.
Figure 14:
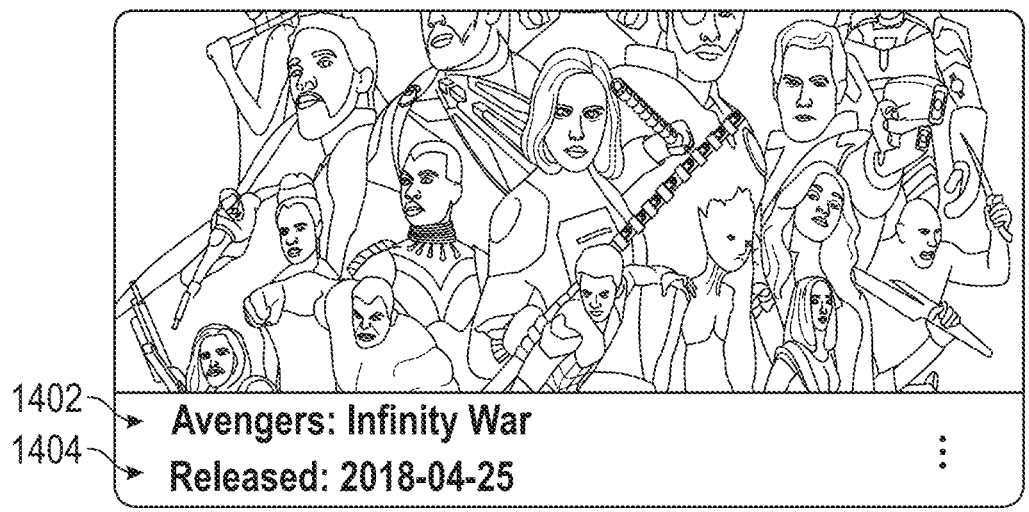
FIG. 14 illustrates an example medium gallery view for gameplans for improved decision making, under an embodiment.

FIGS. 13 to 17 depict example view definitions for current views. FIG. 13 illustrates an example small gallery view 1300 for gameplans for improved decision making, under an embodiment, with the view set to gallery small, the width set to 100 pixels, the transition set to hover to the gallery medium view, the image-top user interface component set to a poster Uniform Resource Locator (URL), and the name set to a title 1302. FIG. 14 illustrates an example medium gallery view 1400 for gameplans for improved decision making, under an embodiment, with the view set to gallery medium, the width set to 200 pixels, the transition set to the button transition to a gallery large view, the image-top user interface component set to a poster URL, the name set to a title 1402, and one slot set to the release date 1404.

Figure 15:
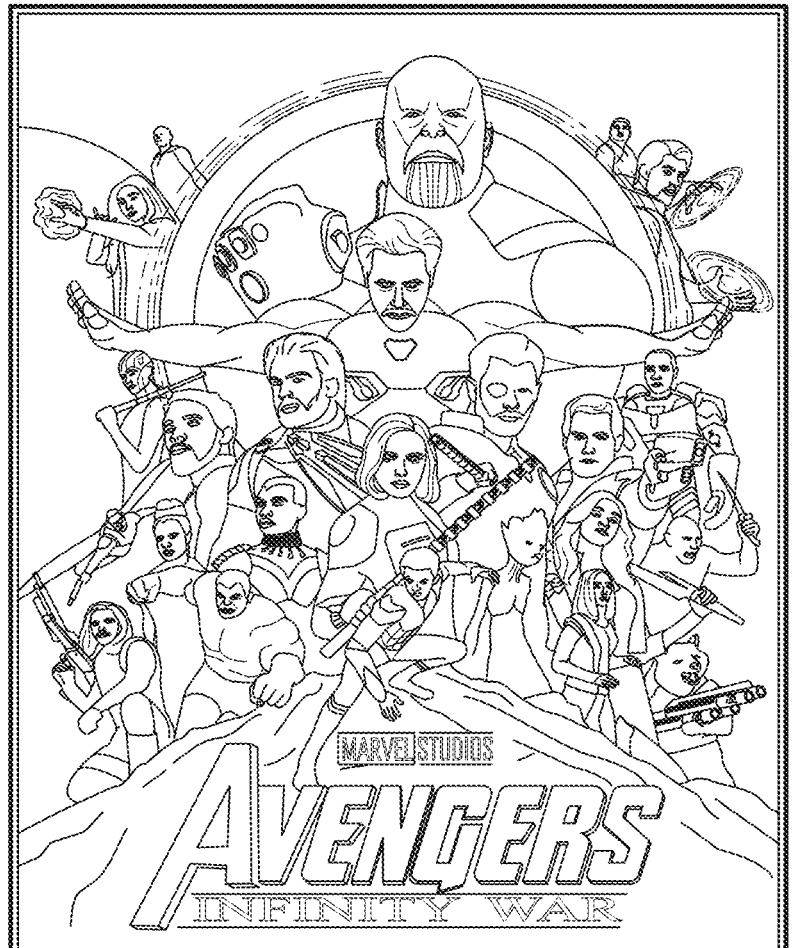
FIG. 15 illustrates an example large gallery view for gameplans for improved decision making, under an embodiment.
Figure 16:
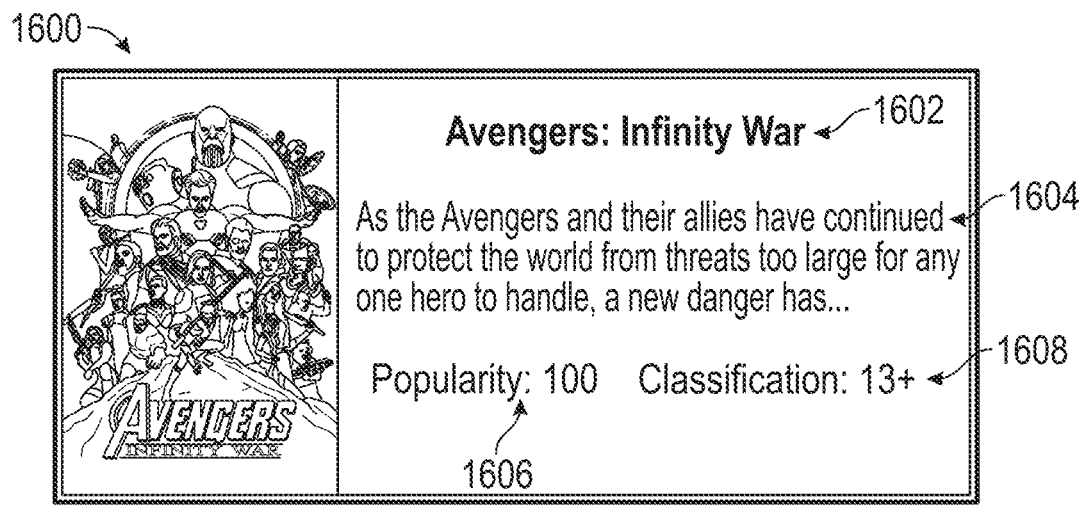
FIG. 16 illustrates an example medium list view for gameplans for improved decision making, under an embodiment.
Figure 17:
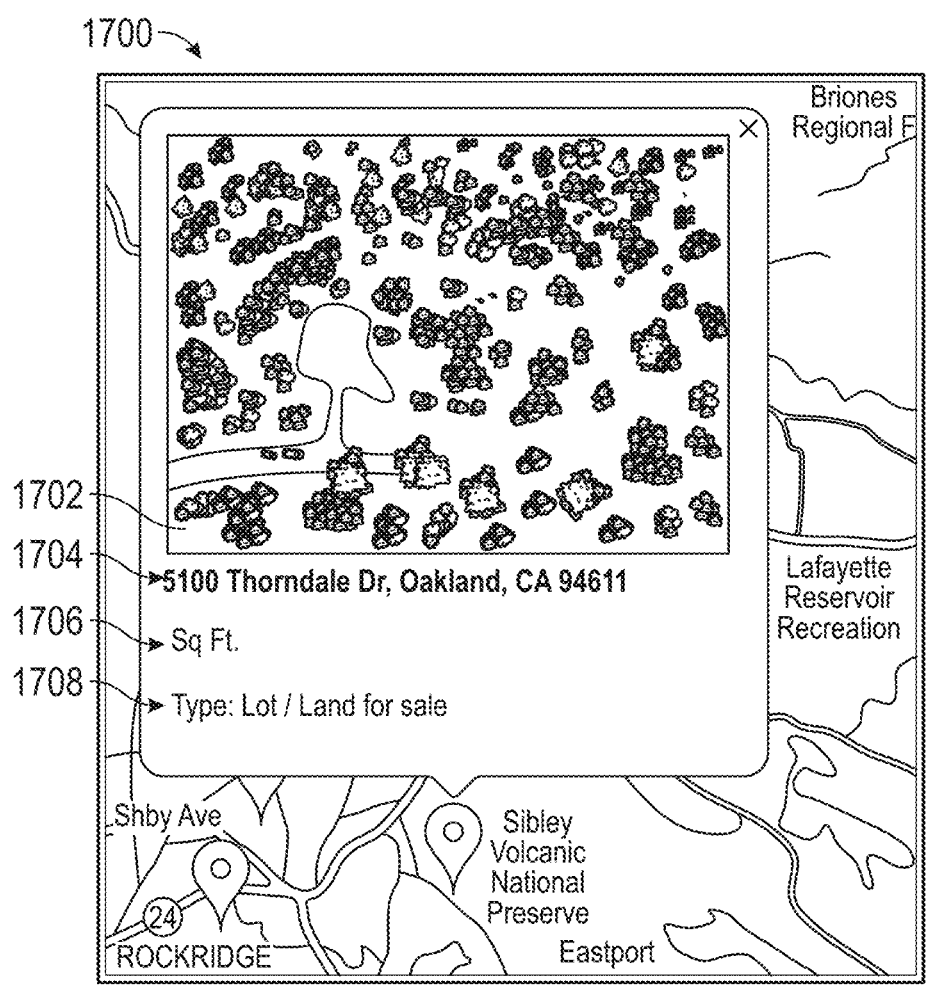
FIG. 17 illustrates an example small map view for gameplans for improved decision making, under an embodiment.

FIG. 15 illustrates an example large gallery view 1500 for gameplans for improved decision making, under an embodiment, with the view set to gallery large, the width set to 300 pixels, the transition set to none, the image-top user interface component set to a poster URL, the name set to a title 1500, the long text set to overview 1500, one slot set to popularity 1500, and another slot set to classification 1500. FIG. 16 illustrates an example medium list view 1600 for gameplans for improved decision making, under an embodiment, with the view set to list medium, the width set to 300 pixels, the transition set to none, the image-left user interface component set to a poster URL, the name set to a title 1602, the long text set to an overview 1604, and the two-slots set to popularity 1606 and classification 1608. FIG. 17 illustrates an example small map view 1700 for gameplans for improved decision making, under an embodiment, with the view set to map small, the width set to 150 pixels, the transition: set to none, the image-top user interface component set to photo 1702, the name set to a property name 1704, and one slot set to square feet (Sq Ft) 1706, and the other slot set to type 1708.

Figure 18:
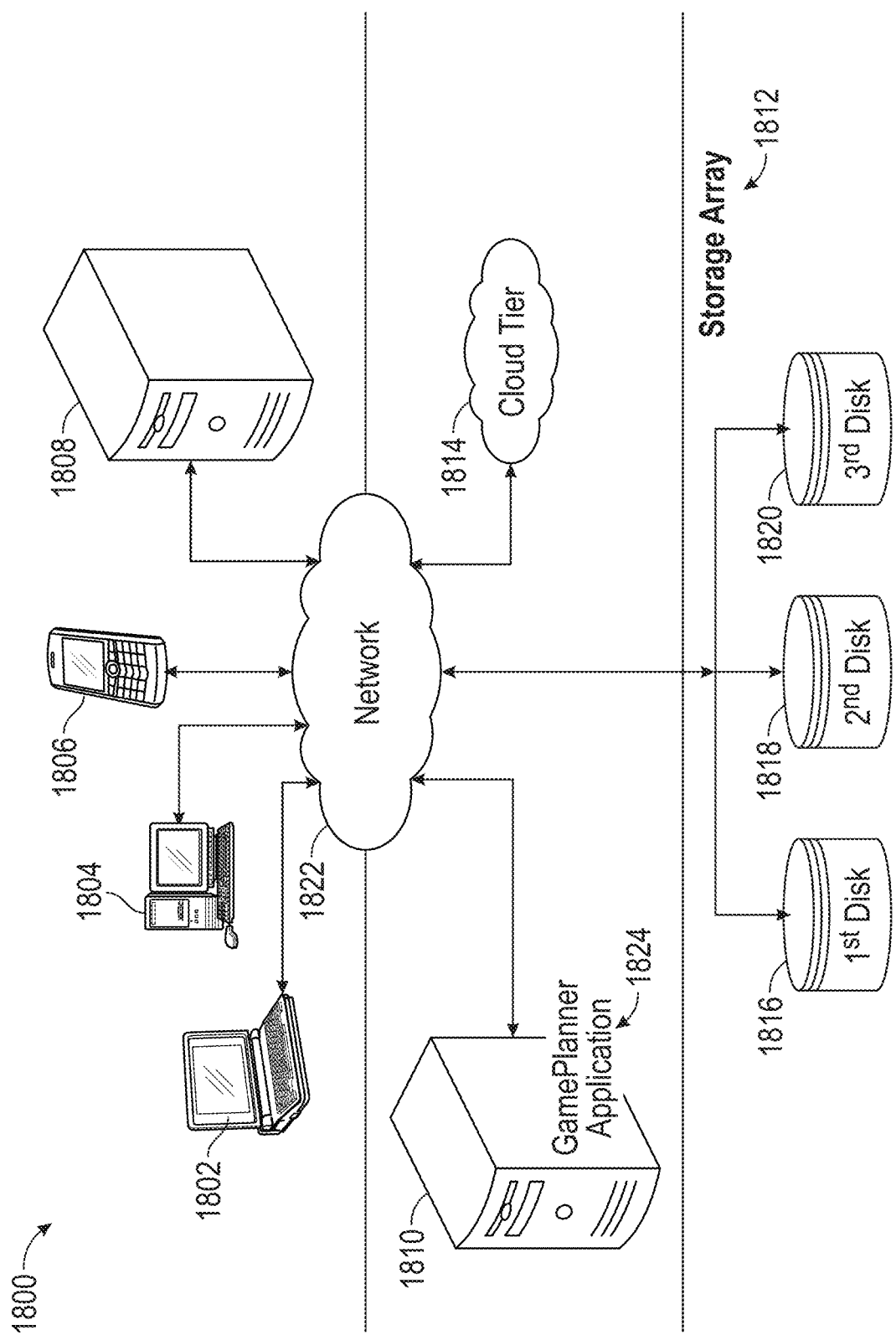
FIG. 18 illustrates a block diagram of an example system for gameplans for improved decision making, under an embodiment.

FIG. 18 illustrates a diagram of a system 1800 for gameplans for improved decision-making, under an embodiment. As shown in FIG. 18, the system 1800 may illustrate a cloud computing environment in which data, applications, services, and other application resources are stored and delivered through shared data centers and appear as a single point of access for the users. The system 1800 may also represent any other type of distributed computer network environment in which servers control the storage and distribution of application resources and services for different client users.

In an embodiment, the system 1800 represents a cloud computing system that includes a first client 1802, a second client 1804, a third client 1806, and a fourth client 1808, and a server 1810, a storage array 1812, and a cloud tier 1814 that may be provided by a hosting company. The storage array 1812 may include a first disk 1816, a second disk 1818, and a third disk 1820. The clients 1802-1808, the server 1810, the storage array 1812, and the cloud tier 1814 communicate via a network 1822.

Although FIG. 18 depicts the first client 1802 as a laptop computer 1802, the second client 1804 as a personal computer 1804, the third client 1806 as a smartphone 1806, and the fourth client 1808 as a server 1808, each of the clients 1802-1808 may be any type of computer. Even though FIG. 18 depicts the system 1800 with four clients 1802-1808, one server 1810, one storage array 1812, one cloud tier 1814, three disks 1816-1820, and one network 1822, the system 1800 may include any number of clients 1802-1808 any number of servers 1810, any number of storage arrays 1812, any number of cloud tiers 1814, any number of disks 1816-1820, and any number of networks 1822. The clients 1802-1808 and the server 1810 may each be substantially like the system 1900 depicted in FIG. 19 and described below.

The server 1810 includes a GamePlanner Application 1824, which can provide, execute, and manage gameplans for improved decision making. Although FIG. 18 depicts one GamePlanner Application 1824 residing completely on the server 1810, any number of the GamePlanner Application 1824 may reside in any combination of partially or completely on the server 1810, on another server which is not depicted in FIG. 18, on the cloud tier 1814, on the discs 1816-1820, and on the clients 1802-1808. When executing the GamePlanner Application 1824, the server 1810 may be referred to as the GamePlanner system 1810.

Figure 19:
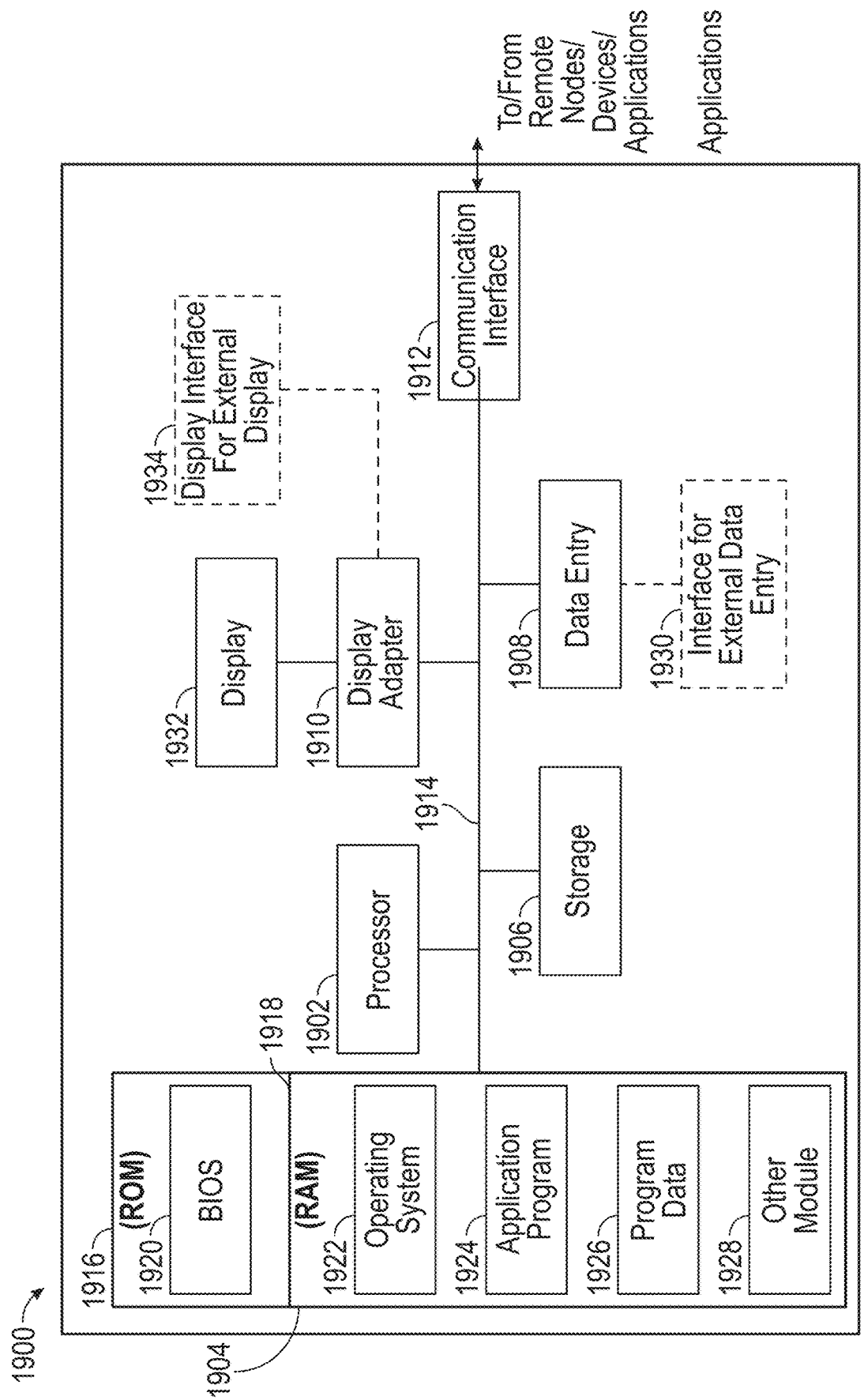
FIG. 19 is a block diagram illustrating an example hardware device in which the subject matter may be implemented.

An exemplary hardware device in which the subject matter may be implemented shall be described. Those of ordinary skill in the art will appreciate that the elements illustrated in FIG. 19 may vary depending on the system implementation. With reference to FIG. 19, an exemplary system for implementing the subject matter disclosed herein includes a hardware device 1900, including a processing unit 1902, a memory 1904, a storage 1906, a data entry module 1908, a display adapter 1910, a communication interface 1912, and a bus 1914 that couples elements 1904-1912 to the processing unit 1902.

The bus 1914 may comprise any type of bus architecture. Examples include a memory bus, a peripheral bus, a local bus, etc. The processing unit 1902 is an instruction execution machine, apparatus, or device and may comprise a microprocessor, a digital signal processor, a graphics processing unit, an application specific integrated circuit (ASIC), a field programmable gate array (FPGA), etc. The processing unit 1902 may be configured to execute program instructions stored in the memory 1904 and/or the storage 1906 and/or received via the data entry module 1908.

The memory 1904 may include a read only memory (ROM) 1916 and a random-access memory (RAM) 1918. The memory 1904 may be configured to store program instructions and data during operation of the device 1900. In various embodiments, the memory 1904 may include any of a variety of memory technologies such as static random-access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 1904 may also include nonvolatile memory technologies such as nonvolatile flash RAM (NVRAM) or ROM. In some embodiments, it is contemplated that the memory 1904 may include a combination of technologies such as the foregoing, as well as other technologies not specifically mentioned. When the subject matter is implemented in a computer system, a basic input/output system (BIOS) 1920, containing the basic routines that help to transfer information between elements within the computer system, such as during start-up, is stored in the ROM 1916.

The storage 1906 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 1900.

It is noted that the methods described herein may be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which may store data that is accessible by a computer, such as magnetic cassettes, flash memory cards, digital video disks, Bernoulli cartridges, RAM, ROM, and the like may also be used in the exemplary operating environment. As used here, a "computer-readable medium" may include one or more of any suitable media for storing the executable instructions of a computer program in one or more of an electronic, magnetic, optical, and electromagnetic format, such that the instruction execution machine, system, apparatus, or device may read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high-definition DVD (HD-DVD™), a BLU-RAY disc; and the like.

A number of program modules may be stored on the storage 1906, the ROM 1916 or the RAM 1918, including an operating system 1922, one or more applications programs 1924, program data 1926, and other program modules 1928. A user may enter commands and information into the hardware device 1900 through data entry module 1908. The data entry module 1908 may include mechanisms such as a keyboard, a touch screen, a pointing device, etc. Other external input devices (not shown) are connected to the hardware device 1900 via an external data entry interface 1930. By way of example and not limitation, external input devices may include a microphone, joystick, game pad, satellite dish, scanner, or the like. In some embodiments, external input devices may include video or audio input devices such as a video camera, a still camera, etc. The data entry module 1908 may be configured to receive input from one or more users of the device 1900 and to deliver such input to the processing unit 1902 and/or the memory 1904 via the bus 1914.

A display 1932 is also connected to the bus 1914 via the display adapter 1910. The display 1932 may be configured to display output of the device 1900 to one or more users. In some embodiments, a given device such as a touch screen, for example, may function as both the data entry module 1908 and the display 1932. External display devices may also be connected to the bus 1914 via the external display interface 1934. Other peripheral output devices, not shown, such as speakers and printers, may be connected to the hardware device 1900.

The hardware device 1900 may operate in a networked environment using logical connections to one or more remote nodes (not shown) via the communication interface 1912. The remote node may be another computer, a server, a router, a peer device or other common network node, and typically includes many or all of the elements described above relative to the hardware device 1900. The communication interface 1912 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 1912 may include logic configured to support direct memory access (DMA) transfers between the memory 1904 and other devices.

In a networked environment, program modules depicted relative to the hardware device 1900, or portions thereof, may be stored in a remote storage device, such as, for example, on a server. It will be appreciated that other hardware and/or software to establish a communications link between the hardware device 1900 and other devices may be used.

It should be understood that the arrangement of the hardware device 1900 illustrated in FIG. 19 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of the hardware device 1900.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 19.

Other components may be implemented in software, hardware, or a combination of software and hardware.

Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the descriptions above, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in a context, it is not meant to be limiting as those of skill in the art will appreciate that various of the acts and operations described hereinafter may also be implemented in hardware.

To facilitate an understanding of the subject matter described above, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for improved decision-making, the system comprising:
   one or more processors; and
   a non-transitory computer readable medium storing a plurality of instructions, which when executed, cause the one or more processors to:
   extract, in response to a request for decision-making options, a first set of structured data from first content, wherein the first content is copied by a user from results of at least one of searching or filtering by the user on a first third-party web data source, the first third-party web data source identified in an interactive document;
   insert the first set of structured data in a first data structure in the interactive document;
   extract a second set of structured data from second content, wherein the second content is copied by the user from results of at least one of searching or filtering by the user on a second third-party web data source, the second third-party web data source identified in the interactive document;
insert the second set of structured data in a second data structure in the interactive document;
insert a combined set of structured data, based on the first set of structured data joined with the second set of structured data, in one of the first data structure, the second data structure, or a third data structure in the interactive document;
identify candidates for the decision-making options in the combined set of structured data in response to a first input entered by a user;
determine overall scores corresponding to the candidates based on applying to each candidate at least a first weight to a first score corresponding to a first criteria, and a second weight to a second score corresponding to a second criteria in response to a second input entered by the user;
lock a ranking of at least one of the candidates based on a user selection of the at least one candidate in the combined set of structured data; and
output a set of ranked candidates, which are ranked based at least on the corresponding overall scores, as the decision-making options, wherein the locked ranking of the at least one of the candidates is maintained within the set of ranked candidates.

2. The system of claim 1, wherein at least one of the first third-party web data source and the second third-party web data source comprises at least one of a website, a data file, a data feed, a live web service, or a web crawler.

3. The system of claim 1, wherein extracting comprises removing structured data, instead of removing all raw Hyper Text Markup Language (HTML) text, from content copied by the user.

4. The system of claim 1, wherein the first input entered by the user comprises at least one of a sort command, a filter command, or a search command.

5. The system of claim 1, wherein the first criteria comprises a first sub-criteria and a second sub-criteria, and the first weight applied to the first score is based on a first sub-criteria weight applied to a first sub-criteria score corresponding to the first-sub-criteria, and a second sub-criteria weight applied to a second sub-criteria score corresponding to the second sub-criteria.

6. The system of claim 1, wherein the plurality of instructions, when executed, will further cause the one or more processors to enable the user to modify a ranking of the candidates based on at least one preference, entered by the user, corresponding to at least one candidate.

7. The system of claim 1, wherein the plurality of instructions, when executed, will further cause the one or more processors to enable the user to modify a ranking of the candidates based on at least one score, determined by at least one other user, corresponding to at least one candidate.

8. A computer-implemented method for improved decision-making, the method comprising:
extracting, in response to a request for decision-making options, a first set of structured data from first content, wherein the first content is copied by a user from results of at least one of searching or filtering by the user on the first third-party web data source, the first third-party web data source identified in an interactive document;
inserting the first set of structured data in a first data structure in the interactive document;
extracting a second set of structured data from second content, wherein the second content is copied by the user from results of at least one of searching or filtering by the user on a second third-party web data source, the second third-party web data source identified in the interactive document;
inserting the second set of structured data in a second data structure in the interactive document;
inserting a combined set of structured data, based on the first set of structured data joined with the second set of structured data, in one of the first data structure, the second data structure or a third data structure in the interactive document;
identifying candidates for the decision-making options in the combined set of structured data in response to a first input entered by a user;
determining overall scores corresponding to the candidates based on applying to each candidate at least a first weight to a first score corresponding to a first criteria, and a second weight to a second score corresponding to a second criteria, in response to a second input entered by the user;
locking a ranking of at least one of the candidates based on a user selection of the at least one candidate in the combined set of structured data; and
outputting a set of ranked candidates, which are ranked based at least on the corresponding overall scores, as the decision-making options, wherein the locked ranking of the at least one of the candidates is maintained within the set of ranked candidates.

9. The computer-implemented method of claim 8, wherein at least one of the first third-party web data source and the second third-party web data source comprises at least one of a website, a data file, a data feed, a live web service, or a web crawler.

10. The computer-implemented method of claim 8, wherein extracting comprises removing relevant semantic records, instead of removing raw Hyper Text Markup Language (HTML) text, from content copied by the user.

11. The computer-implemented method of claim 8, wherein the first input entered by the user comprises at least one of a sort command, a filter command, or a search command.

12. The computer-implemented method of claim 8, wherein the criteria, scored by the user, comprises hierarchical weighted decision criteria that includes a first criteria corresponding to a first criteria weight, wherein the first criteria comprises a first sub-criteria corresponding to a first sub-criteria weight and a second sub-criteria corresponding to a second sub-criteria weight, and a second criteria corresponding to a second criteria weight.

13. The computer-implemented method of claim 8, wherein the method further comprises enabling the user to modify a ranking of the candidates based on at least one preference, entered by the user, corresponding to at least one candidate.

14. The computer-implemented method of claim 8, wherein the method further comprises enabling the user to modify a ranking of the candidates based on at least one score, determined by at least one other user, corresponding to at least one candidate.

15. A computer program product, comprising a non-transitory computer-readable medium having a computer-readable program code embodied therein to be executed by one or more processors, the program code including instructions to:
extract, in response to a request for decision-making options, a first set of structured data from first content, wherein the first content is copied by a user from results of at least one of searching or filtering by the user on the first third-party web data source, the first third-party web data source identified in an interactive document;

insert the first set of structured data in a first data structure in the interactive document;

extract a second set of structured data from second content, wherein the second content is copied by the user from results of at least one of searching or filtering by the user on a second third-party web data source, the second third-party web data source identified in the interactive document;

insert the second set of structured data in a second data structure in the interactive document;

insert a combined set of structured data, based on the first set of structured data joined with the second set of structured data, in one of the first data structure, the second data structure or a third data structure in the interactive document;

identify candidates for the decision-making options in the combined set of structured data in response to a first input entered by a user;

determine overall scores corresponding to the candidates based on applying to each candidate at least a first weight to a first score corresponding to a first criteria, and a second weight to a second score corresponding to a second criteria in response to a second input entered by the user;

lock a ranking of at least one of the candidates based on a user selection of the at least one candidate in the combined set of structured data; and output a set of ranked candidates, which are ranked based at least on the corresponding overall scores, as the decision-making options, wherein the locked ranking of the at least one of the candidates is maintained within the set of ranked candidates.

16. The computer program product of claim 15, wherein at least one of the first third-party web data source and the second third-party web data source comprises at least one of a website, a data file, a data feed, a live web service, or a web crawler, and extracting comprises removing relevant semantic records, instead of removing raw Hyper Text Markup Language (HTML) text, from content copied by the user.

17. The computer program product of claim 15, wherein the first input entered by the user comprises at least one of a sort command, a filter command, or a search command.

18. The computer program product of claim 15, wherein the criteria, scored by the user, comprises hierarchical weighted decision criteria that includes a first criteria corresponding to a first criteria weight, wherein the first criteria comprises a first sub-criteria corresponding to a first sub-criteria weight and a second sub-criteria corresponding to a second sub-criteria weight, and a second criteria corresponding to a second criteria weight.

19. The computer program product of claim 15, wherein the program code further includes instructions to enable the user to modify a ranking of the candidates based on at least one preference, entered by the user, corresponding to at least one candidate.

20. The computer program product of claim 15, wherein the program code further includes instructions to enable the user to modify a ranking of the candidates based on at least one score, determined by at least one other user, corresponding to at least one candidate.

* * * * *